(12) United States Patent
Kocienda et al.

(10) Patent No.: US 11,949,808 B2
(45) Date of Patent: Apr. 2, 2024

(54) CONTEXT-SENSITIVE HOME SCREENS FOR USE WITH WEARABLE MULTIMEDIA DEVICES

(71) Applicant: Humane, Inc., San Francisco, CA (US)

(72) Inventors: Kenneth Luke Kocienda, Mill Valley, CA (US); Imran A. Chaudhri, San Francisco, CA (US)

(73) Assignee: Humane, Inc., San Francisco, CA (US)

(*) Notice: Subject to any disclaimer, the term of this patent is extended or adjusted under 35 U.S.C. 154(b) by 0 days.

(21) Appl. No.: 17/687,595

(22) Filed: Mar. 4, 2022

(65) Prior Publication Data
US 2023/0283707 A1    Sep. 7, 2023

(51) Int. Cl.
*H04M 1/72454* (2021.01)
*G06F 3/01* (2006.01)
*H04M 1/72457* (2021.01)
*H04M 1/72469* (2021.01)

(52) U.S. Cl.
CPC ........ *H04M 1/72454* (2021.01); *G06F 3/013* (2013.01); *G06F 3/017* (2013.01); *H04M 1/72457* (2021.01); *H04M 1/72469* (2021.01)

(58) Field of Classification Search
CPC ......... H04M 1/72454; H04M 1/72469; H04M 1/72457; G06F 3/013; G06F 3/017
See application file for complete search history.

(56) References Cited

U.S. PATENT DOCUMENTS

| | | | |
|---|---|---|---|
| 8,836,768 B1* | 9/2014 | Rafii | G02B 27/017 348/47 |
| 9,953,101 B1* | 4/2018 | Walliser | G06F 21/32 |
| 2014/0123022 A1 | 5/2014 | Lee et al. | |
| 2015/0248235 A1* | 9/2015 | Offenberg | G06F 3/0237 715/773 |
| 2016/0188671 A1* | 6/2016 | Gupta | H04L 51/52 707/722 |
| 2017/0075551 A1* | 3/2017 | Robinson | G06F 1/169 |
| 2019/0373127 A1* | 12/2019 | Tsuji | G06F 3/1204 |
| 2021/0096637 A1* | 4/2021 | Wang | G06F 3/017 |

(Continued)

OTHER PUBLICATIONS

International Search Report and Written Opinion in International Appln. No. PCT/US2023/014492, dated Mar. 28, 2023, 8 pages.

(Continued)

*Primary Examiner* — Sherrod L Keaton
(74) *Attorney, Agent, or Firm* — Fish & Richardson P.C.

(57) ABSTRACT

Systems, methods, devices and non-transitory, computer-readable storage mediums are disclosed for a wearable multimedia device and, in some implementations, a cloud computing platform. In some implementations, in a method for presentation of a home screen. In response to determining that a waking condition of a mobile device is satisfied, an environment of the mobile device is sensed using one or more sensors of the mobile device. Based at least on the sensing, a current context of the mobile device is determined. In response to determining the current context of the mobile device, a particular content is selected from among a plurality of content, the particular content being relevant to a user of the mobile device based on the current context of the mobile device. The particular content is presented as a home screen of the mobile device upon waking the mobile device.

20 Claims, 21 Drawing Sheets

(56) References Cited

U.S. PATENT DOCUMENTS

2021/0173704 A1* 6/2021 Fullmer ............... G06F 9/4881
2022/0350414 A1* 11/2022 Lee ...................... G06F 3/012

OTHER PUBLICATIONS

Kanel, "Sixth Sense Technology," Thesis for the Bachelor Degree of Engineering in Information and Technology, Centria University of Applied Sciences, May 2014, 46 pages.

Mann et al., "Telepointer: Hands-Free Completely Self Contained Wearable Visual Augmented Reality without Headwear and without any Infrastructural Reliance", IEEE Fourth International Symposium on Wearable Computers, Atlanta, GA, USA, Oct. 16-17, 2000, 4 pages.

Mann, "Wearable Computing: A First Step Toward Personal Imaging, " IEEE Computer, Feb. 1997, 30(2):25-32.

Mann, "Wearable, tetherless computer-mediated reality," American Association of Artificial Intelligence Technical Report, Feb. 1996, 62-69, 8 pages.

Metavision.com [online], "Sensularity with a Sixth Sense," available on or before Apr. 7, 2015, via Internet Archive: Wayback Machine URL <http://web.archive.org/web/20170901072037/https://blog.metavision.com/professor-steve-mann-society-of-sensularity-with-a-sixth-sense/> retrieved on Apr. 25, 2023, URL <https://blog.metavision.com/professor-steve-mann-society-of-sensularity-with-a-sixth-sense/>, 4 pages.

Mistry et al., "WUW—wear Ur world: a wearable gestural interface", Proceedings of the 27th international conference Extended Abstracts on Human Factors in Computing Systems—CHI EA '09, Boston, MA, USA, Apr. 4-9, 2009, 6 pages.

Shetty et al., "Sixth Sense Technology," International Journal of Science and Research, Dec. 2014, 3(12):1068-1073.

* cited by examiner

CONTEXT-SENSITIVE HOME SCREENS FOR USE WITH WEARABLE MULTIMEDIA DEVICES

TECHNICAL FIELD

This disclosure relates generally to structuring and presenting event data for use with mobile devices such as wearable multimedia devices.

BACKGROUND

High-precision laser scanners (e.g., MEMS scanners) have been developed that can turn any surface into a virtual interface (VI). For example, a laser-projected VI can be projected onto the palm of a user's hand or other surface. Three-dimensional (3D) depth sensors (e.g., a time of flight (TOF) camera) can be used to detect user gestures that are interacting with one or more VI elements projected on the surface.

SUMMARY

Systems, methods, devices, and non-transitory, computer-readable storage media are disclosed for presenting context-sensitive home screens using mobile devices, such as for presentation using a laser-projected VI associated with a wearable multimedia device. When a mobile device is switched from an inactive state to an active state, such as from an asleep state to an awake state, content can be presented by the mobile device as a home screen. However, because the switch from the inactive state to the active state is often precipitated by a waking-related user interaction that does not specify particular content that the user desires to view, it may be unclear what content should be presented initially when the mobile device switches to the active state. According to implementations of this data, users are presented with customized, context-specific home screens upon waking their devices, displaying relevant content that is determined based on the context of the mobile device and/or of the user of the mobile device. For example, when a user drives up to a kiosk of a car wash, the home screen that is displayed when the user's device is switched to the active state (in response to a waking interaction) can automatically present a coupon for the car wash. When the user subsequently enters a grocery store, the same waking interaction that previously caused the home screen with the coupon to be displayed now causes a home screen with a shopping list to be displayed.

The implementations described herein can provide various benefits. For instance, in some implementations, relevant content can be made more readily available to users, such as immediately when users wake their mobile devices. Providing relevant content more quickly can improve the user experience and reduce friction or possible user error associated with user interactions with the mobile device. In some implementations, a number of interactions by the user needed to view relevant content can be reduced. In some implementations, relevant content can be presented more completely in a home screen, e.g., in a more complete manner compared truncated notifications or other icon types.

Some aspects of this disclosure describe a computer-implemented method. In the method, it is determined that a waking condition of a mobile device is satisfied. In response to determining that the waking condition is satisfied, an environment of the mobile device is sensed using one or more sensors of the mobile device. Based at least on the sensing, a current context of the mobile device is determined. In response to determining the current context of the mobile device, a particular content is selected from among a plurality of content. The particular content is relevant to a user of the mobile device based on the current context of the mobile device. The particular content is presented as a home screen of the mobile device upon waking the mobile device.

Implementations of this and other disclosed methods can have any one or more of at least the following characteristics.

In some implementations, a default home screen is associated with the mobile device. Presenting the particular content as the home screen includes presenting the particular content as the home screen replacing the default home screen.

In some implementations, the default home screen includes a plurality of icons corresponding to a plurality of applications on the mobile device that are associated with the plurality of content. The particular content is associated with a particular application of the plurality of applications.

In some implementations, subsequent to presenting the particular content, the method includes detecting an interaction from the user with the mobile device, and, in response to detecting the interaction, presenting the default home screen using the mobile device. The default home screen includes one or more icons.

In some implementations, presenting the particular content as the home screen includes presenting the particular content with a formatting with which the particular content is presented in an application associated with the particular content.

In some implementations, presenting the particular content includes opening an application corresponding to the particular content, and presenting an interface of the application as the home screen, including displaying the particular content in the interface.

In some implementations, determining that the waking condition is satisfied includes detecting a waking interaction with the mobile device by the user, and presenting the particular content is performed in the absence of further user interaction with the mobile device besides the waking interaction.

In some implementations, sensing the environment of the mobile device using the one or more sensors includes determining a current location of the mobile device using at least one of (i) one or more location sensors of the mobile device, or (ii) visual data captured by the mobile device. Determining the current context includes identifying an entity in proximity to the current location of the mobile device.

In some implementations, the entity includes a business, a residence, or an object.

In some implementations, the entity includes at least one person.

In some implementations, determining the current context includes accessing calendar data on the mobile device or on a platform remote to the mobile device. The current context includes a current time relative to one or more events included in the calendar data.

In some implementations, the one or more sensors include a motion sensor, and determining the current context includes determining an action being performed by the user based on data from the motion sensor.

In some implementations, presenting the particular content includes presenting a graphical interface in which all elements are associated with the particular content.

In some implementations, determining that the waking condition is satisfied includes: detecting, using a visual sensor, a known hand gesture performed by the user, or detecting, using an audio sensor, a known waking phrase spoken by the user.

In some implementations, determining that the waking condition is satisfied is based on a gaze of the user.

In some implementations, selecting the particular content includes inputting the current context of the mobile device into a machine learning model, and obtaining, as an output of the machine learning model, a selection of the content as most relevant to the user from among the plurality of content.

These and other methods described in this disclosure may be implemented at least as methods, systems, devices, and non-transitory, computer-readable storage media. The details of the disclosed implementations are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

Example Wearable Multimedia Device

Figure 1:
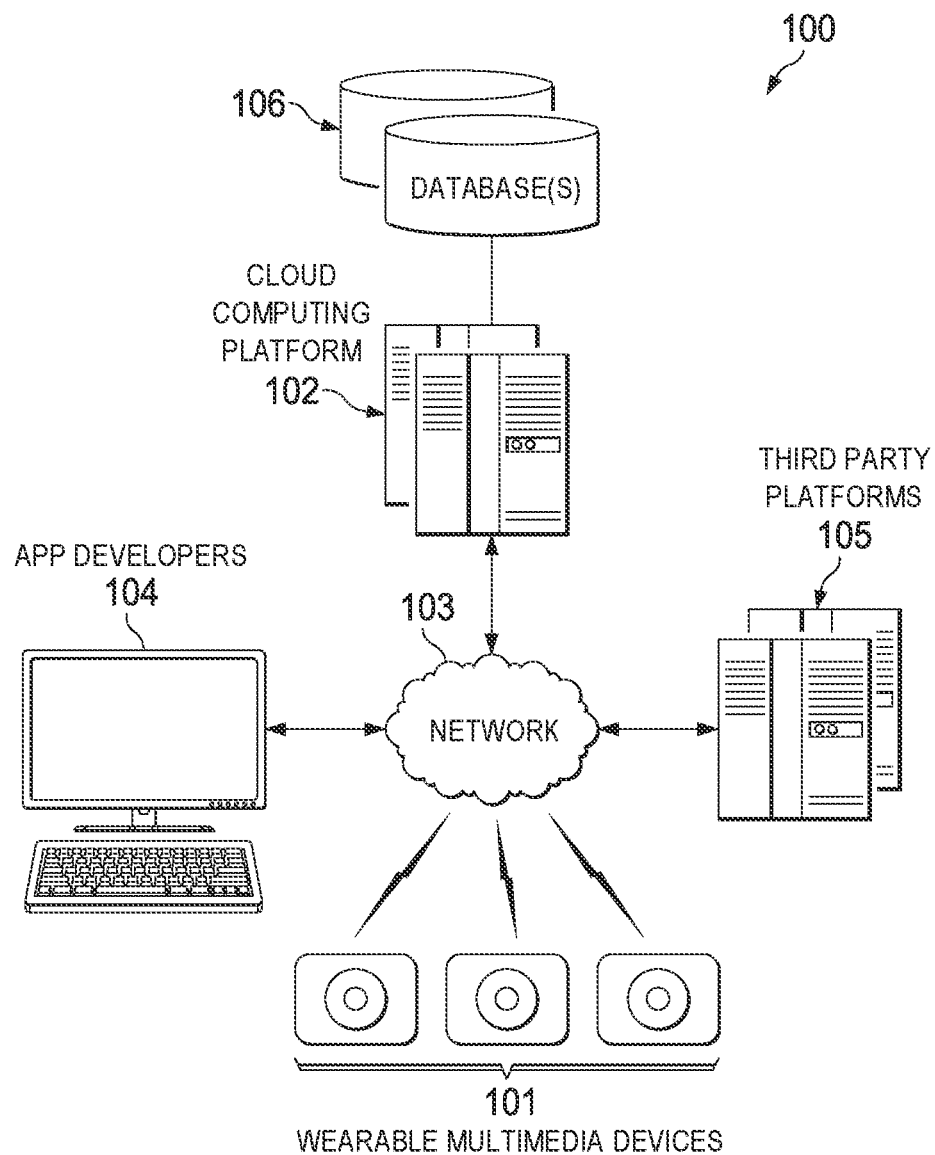
FIG. 1 is a block diagram of an operating environment for a wearable multimedia device and cloud computing platform with an application ecosystem for processing multimedia data captured by the wearable multimedia device, according to some implementations of this disclosure

The features and processes described herein can be implemented on a wearable multimedia device. In some implementations, the wearable multimedia device is a lightweight, small form factor, battery-powered device that can be attached to a user's clothing or an object using a tension clasp, interlocking pin back, magnet, or any other attachment mechanism. The wearable multimedia device includes a digital image capture device (e.g., a camera with a 180° FOV with optical image stabilizer (OIS)) that allows a user to spontaneously and/or continuously capture multimedia data (e.g., video, audio, depth data, biometric data) of life events ("moments") and document transactions (e.g., financial transactions) with minimal user interaction or device set-up. The multimedia data (included in "context data," which, as described in further detail below, in some implementations can include other type(s) of data) captured by the wireless multimedia device is uploaded to a cloud computing platform with an application ecosystem that allows the context data to be processed, edited and formatted by one or more applications (e.g., Artificial Intelligence (AI) applications) into any desired presentation format (e.g., single image, image stream, video clip, audio clip, multimedia presentation, or image gallery) that can be downloaded and replayed on the wearable multimedia device and/or any other playback device. For example, the cloud computing platform can transform video data and audio data into any desired filmmaking style (e.g., documentary, lifestyle, candid, photojournalism, sport, street) specified by the user.

In some implementations, the context data is processed by server computer(s) of the cloud computing platform based on user preferences. For example, images can be color graded, stabilized and cropped perfectly to the moment the user wants to relive based on the user preferences. The user preferences can be stored in a user profile created by the user through an online account accessible through a website or portal, or the user preferences can be learned by the platform over time (e.g., using machine learning). In some implementations, the cloud computing platform is a scalable distributed computing environment. For example, the cloud computing platform can be a distributed streaming platform (e.g., Apache Kafka™) with real-time streaming data pipelines and streaming applications that transform or react to streams of data.

In some implementations, the user can start and stop a context data capture session on the wearable multimedia device with a simple touch gesture (e.g., a tap or swipe), by speaking a command or any other input mechanism. All or portions of the wearable multimedia device can automatically power down when it detects that it is not being worn by the user using one or more sensors (e.g., proximity sensor, optical sensor, accelerometers, gyroscopes).

The context data can be encrypted and compressed and stored in an online database associated with a user account using any desired encryption or compression technology. The context data can be stored for a specified period of time that can be set by the user. The user can be provided through a website, portal or mobile application with opt-in mechanisms and other tools for managing their data and data privacy.

In some implementations, the context data includes point cloud data to provide three-dimensional (3D) surface mapped objects that can be processed using, for example, augmented reality (AR) and virtual reality (VR) applications in the application ecosystem. The point cloud data can be generated by a depth sensor (e.g., LiDAR or Time of Flight (TOF)) embedded on the wearable multimedia device.

In some implementations, the wearable multimedia device includes a Global Navigation Satellite System (GNSS) receiver (e.g., Global Positioning System (GPS)) and one or more inertial sensors (e.g., accelerometers, gyroscopes) for determining the location and orientation of the user wearing the device when the context data was captured. In some implementations, one or more images in the context data can be used by a localization application, such as a visual odometry application, in the application ecosystem to determine the position and orientation of the user.

In some implementations, the wearable multimedia device can also include one or more environmental sensors, including but not limited to: an ambient light sensor, magnetometer, pressure sensor, voice activity detector, etc. This sensor data can be included in the context data to enrich a content presentation with additional information that can be used to capture the moment.

In some implementations, the wearable multimedia device can include one or more biometric sensors, such as a heart rate sensor, fingerprint scanner, etc. This sensor data can be included in the context data to document a transaction or to indicate the emotional state of the user during the moment (e.g., elevated heart rate could indicate excitement or fear).

In some implementations, the wearable multimedia device includes a headphone jack connecting a headset or earbuds, and one or more microphones for receiving voice command and capturing ambient audio. Instead or additionally, in some implementations, the wearable multimedia device includes short range communication technology, including but not limited to Bluetooth, IEEE 802.15.4 (ZigBee™) and near field communications (NFC). The short range communication technology can be used to wirelessly connect to a wireless headset or earbuds in addition to, or in place of the headphone jack, and/or can wirelessly connect to any other external device (e.g., a computer, printer, projector, television and other wearable devices).

In some implementations, the wearable multimedia device includes a wireless transceiver and communication protocol stacks for a variety of communication technologies, including Wi-Fi, 3G, 4G, and/or 5G communication technologies. In some implementations, the headset or earbuds also include sensors (e.g., biometric sensors, inertial sensors) that provide information about the direction the user is facing, to provide commands with head gestures or playback of spatial audio, etc. In some implementations, the camera direction can be controlled by the head gestures, such that the camera view follows the user's view direction. In some implementations, the wearable multimedia device can be embedded in or attached to the user's glasses.

In some implementations, the wearable multimedia device includes a projector (e.g., a laser projector) or other digital projection technology (e.g., Liquid Crystal on Silicon (LCoS or LCOS), Digital Light Processing (DLP) or Liquid Chrystal Display (LCD) technology), or can be wired or wirelessly coupled to an external projector, that allows the user to replay a moment on a surface such as a wall or table top or on a surface of the user's hand (e.g., the user's palm). Instead or additionally, in some implementations, the wearable multimedia device includes an output port that can connect to a projector or other output device.

In some implementations, the wearable multimedia capture device includes a touch surface responsive to touch gestures (e.g., a tap, multi-tap or swipe gesture). The wearable multimedia device may include a small display for presenting information and one or more light indicators to indicate on/off status, power conditions or any other desired status.

In some implementations, the cloud computing platform can be driven by context-based gestures (e.g., air gesture) in combination with speech queries, such as the user pointing to an object in their environment and saying: "What is that building?" The cloud computing platform uses the air gesture to narrow the scope of the viewport of the camera and isolate the building. One or more images of the building are captured and optionally cropped (e.g., to protect privacy) and sent to the cloud computing platform where an image recognition application can run an image query and store or return the results to the user. Air and touch gestures can also be performed on a projected ephemeral display, for example, responding to user interface elements projected on a surface.

In some implementations, the context data can be encrypted on the device and on the cloud computing platform so that only the user or any authorized viewer can relive the moment on a connected screen (e.g., smartphone, computer, television, etc.) or as a projection on a surface. An example architecture for the wearable multimedia device is described in reference to FIG. 8.

In addition to personal life events, the wearable multimedia device simplifies the capture of financial transactions that are currently handled by smartphones. The capture of every day transactions (e.g., business transactions, micro transactions) is made simpler, faster, and more fluid by using sight assisted contextual awareness provided by the wearable multimedia device. For example, when the user engages in a financial transaction (e.g., making a purchase), the wearable multimedia device will generate data memorializing the financial transaction, including a date, time, amount, digital images or video of the parties, audio (e.g., user commentary describing the transaction) and environment data (e.g., location data). The data can be included in a multimedia data stream sent to the cloud computing platform, where it can be stored online and/or processed by one or more financial applications (e.g., financial management, accounting, budget, tax preparation, inventory, etc.).

In some implementations, the cloud computing platform provides graphical user interfaces on a website or portal that allow various third party application developers to upload, update, and manage their applications in an application ecosystem. Some example applications can include but are not limited to: personal live broadcasting (e.g., Instagram™ Life, Snapchat™), senior monitoring (e.g., to ensure that a loved one has taken their medicine), memory recall (e.g., showing a child's soccer game from last week), and personal guide (e.g., AI enabled personal guide that knows the location of the user and guides the user to perform an action).

In some implementations, the wearable multimedia device includes one or more microphones and a headset. In some implementations, the headset wire includes the microphone. In some implementations, a digital assistant is implemented on the wearable multimedia device that responds to user queries, requests and commands. For example, the wearable multimedia device worn by a parent captures moment context data for a child's soccer game, and in particular a "moment" where the child scores a goal. The user can request (e.g., using a speech command) that the platform create a video clip of the goal and store it in their user account. Without any further actions by the user, the cloud computing platform identifies the correct portion of the moment context data (e.g., using face recognition, visual or audio cues) when the goal is scored, edits the moment context data into a video clip, and stores the video clip in a database associated with the user account.

In some implementations, the wearable multimedia device can include photovoltaic surface technology to sustain battery life and inductive charging circuitry (e.g., Qi) to allow for inductive charging on charge mats and wireless over-the-air (OTA) charging.

In some implementations, the wearable multimedia device is configured to magnetically couple or mate with a rechargeable portable battery pack. The portable battery pack includes a mating surface that has permanent magnet (e.g., N pole) disposed thereon, and the wearable multimedia device has a corresponding mating surface that has permanent magnet (e.g., S pole) disposed thereon. Any number of permanent magnets having any desired shape or size can be arranged in any desired pattern on the mating surfaces.

The permanent magnets hold portable battery pack and wearable multimedia device together in a mated configuration with clothing (e.g., a user's shirt) in between. In some implementations, the portable battery pack and wearable multimedia device have the same mating surface dimensions, such that there is no overhanging portions when in a mated configuration. A user magnetically fastens the wearable multimedia device to their clothing by placing the portable battery pack underneath their clothing and placing the wearable multimedia device on top of portable battery pack outside their clothing, such that permanent magnets attract each other through the clothing.

In some implementations, the portable battery pack has a built-in wireless power transmitter which is used to wirelessly power the wearable multimedia device while in the mated configuration using the principle of resonant inductive coupling. In some implementations, the wearable multimedia device includes a built-in wireless power receiver which is used to receive power from the portable battery pack while in the mated configuration.

System Overview

FIG. 1 is a block diagram of an operating environment for a wearable multimedia device and cloud computing platform with an application ecosystem for processing multimedia data captured by the wearable multimedia device, according to some implementations. Operating environment 100 includes wearable multimedia devices 101, cloud computing platform 102, network 103, application ("app") developers 104 and third party platforms 105. Cloud computing platform 102 is coupled to one or more databases 106 for storing context data uploaded by wearable multimedia devices 101.

As previously described, wearable multimedia devices 101 are lightweight, small form factor, battery-powered devices that can be attached to a user's clothing or an object using a tension clasp, interlocking pin back, magnet or any other attachment mechanism. Wearable multimedia devices 101 include a digital image capture device (e.g., a camera with a 180° FOV and OIS) that allows a user to spontaneously capture multimedia data (e.g., video, audio, depth data) of "moments" and document every day transactions (e.g., financial transactions) with minimal user interaction or device set-up. The context data captured by wearable multimedia devices 101 are uploaded to cloud computing platform 102. Cloud computing platform 102 includes an application ecosystem that allows the context data to be processed, edited and formatted by one or more server side applications into any desired presentation format (e.g., single image, image stream, video clip, audio clip, multimedia presentation, images gallery) that can be downloaded and replayed on the wearable multimedia device and/or other playback device.

By way of example, at a child's birthday party a parent can clip the wearable multimedia device on their clothing (or attached the device to a necklace or chain and wear around their neck) so that the camera lens is facing in their view direction. The camera includes a 180° FOV that allows the camera to capture almost everything that the user is currently seeing. The user can start recording by simply tapping the surface of the device or pressing a button or speaking a command. No additional set-up is required. A multimedia data stream (e.g., video with audio) is recorded that captures the special moments of the birthday (e.g., blowing out the candles). This "context data" is sent to cloud computing platform 102 in real-time through a wireless network (e.g., Wi-Fi, cellular). In some implementations, the context data is stored on the wearable multimedia device so that it can be uploaded at a later time. Instead or additionally, in some implementations, the user can transfer the context data to another device (e.g., personal computer hard drive, smartphone, tablet computer, thumb drive) and upload the context data to cloud computing platform 102 at a later time using an application.

In some implementations, the context data is processed by one or more applications of an application ecosystem hosted and managed by cloud computing platform 102. Applications can be accessed through their individual application programming interfaces (APIs). A custom distributed streaming pipeline is created by cloud computing platform 102 to process the context data based on one or more of the data type, data quantity, data quality, user preferences, templates and/or any other information to generate a desired presentation based on user preferences. In some implementations, machine learning technology can be used to automatically select suitable applications to include in the data processing pipeline with or without user preferences. For example, historical user context data stored in a database (e.g., NoSQL database) can be used to determine user preferences for data processing using any suitable machine learning technology (e.g., deep learning or convolutional neural networks).

In some implementations, the application ecosystem can include third party platforms 105 that process context data. Secure sessions are set-up between cloud computing platform 102 and third party platforms 105 to send/receive context data. This design allows third party app providers to control access to their application and to provide updates. Instead or additionally, in some implementations, the applications are run on servers of cloud computing platform 102 and updates are sent to cloud computing platform 102. In the latter implementations, app developers 104 can use an API provided by cloud computing platform 102 to upload and update applications to be included in the application ecosystem.

Example Data Processing System

Figure 2:
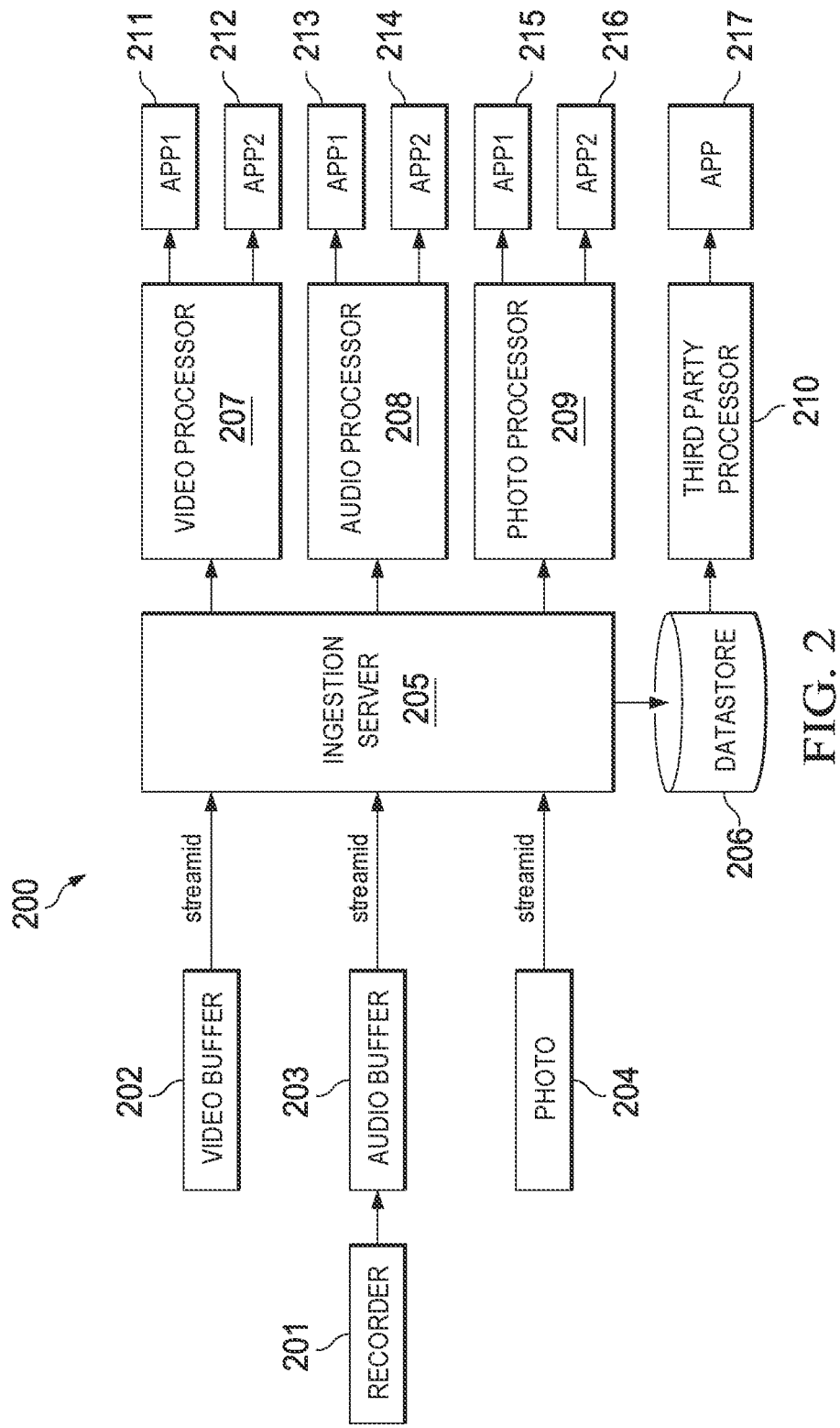
FIG. 2 is a block diagram of a data processing system implemented by the cloud computing platform of FIG. 1, according to some implementations of this disclosure.

FIG. 2 is a block diagram of a data processing system implemented by the wearable multimedia device and the cloud computing platform of FIG. 1, according to some implementations. Data processing system 200 includes recorder 201, video buffer 202, audio buffer 203, photo buffer 204, ingestion server 205, data store 206, video processor 207, audio processor 208, photo processor 209, and third party processor 210.

A recorder 201 (e.g., a software application) running on a wearable multimedia device records video, audio and photo data ("context data") captured by a camera and audio subsystem, and stores the data in buffers 202, 203, 204, respectively. This context data is then sent (e.g., using wireless OTA technology) to ingestion server 205 of cloud computing platform 102. In some implementations, the data can be sent in separate data streams each with a unique stream identifier (streamid). The streams are discrete pieces of data that may include the following example attributes: location (e.g., latitude, longitude), user, audio data, video stream of varying duration, and N number of photos. A stream can have a duration of 1 to MAXSTREAM_LEN seconds, where in this example MAXSTREAM_LEN=20 seconds.

Ingestion server 205 ingests the streams and creates a stream record in data store 206 to store the results of processors 207-209. In some implementations, the audio stream is processed first and is used to determine the other streams that are needed. Ingestion server 205 sends the streams to the appropriate processor 207-209 based on streamid. For example, the video stream is sent to video processor 207, the audio stream is sent to audio processor 208 and the photo stream is sent to photo processor 209. In some implementations, at least a portion of data collected from the wearable multimedia device (e.g., image data) is processed into metadata and encrypted so that it can be further processed by a given application and sent back to the wearable multimedia device or other device.

Processors 207-209 can run proprietary or third party applications as previously described. For example, video processor 207 can be a video processing server that sends raw video data stored in video buffer 202 to a set of one or more image processing/editing applications 211, 212 based on user preferences or other information. Processor 207 sends requests to applications 211, 212, and returns the results to ingestion server 205. In some implementations, third party processor 210 can process one or more of the streams using its own processor and application 217. In another example, audio processor 208 can be an audio processing server that sends speech data stored in audio buffer 203 to speech-to-text converter applications 213, 214. In another example, photo processor 209 can be an image processing server that sends image data stored in photo buffer 204 to image processing applications 215, 216.

Example Scene Identification Application

Figure 3:
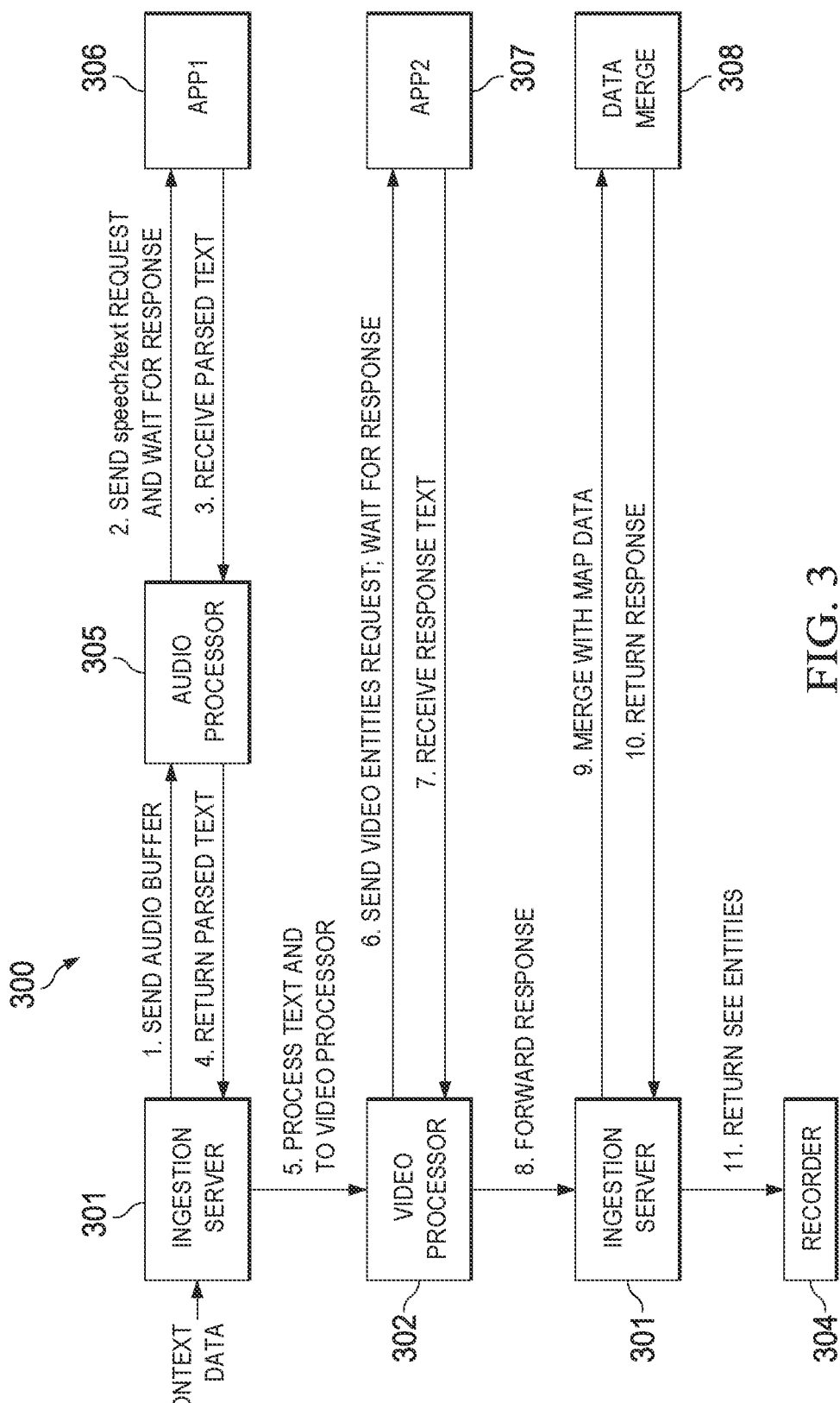
FIG. 3 is a block diagram of a data processing pipeline for processing a context data stream, according to some implementations of this disclosure.

FIG. 3 is a block diagram of a data processing pipeline for processing a context data stream, according to some implementations. In such implementations, data processing pipeline 300 is created and configured to determine what the user is seeing based on the context data captured by a wearable multimedia device worn by the user. Ingestion server 301 receives an audio stream (e.g., including user commentary) from audio buffer 203 of wearable multimedia device and sends the audio stream to audio processor 305. Audio processor 305 sends the audio stream to app 306 which performs speech-to-text conversion and returns parsed text to audio processor 305. Audio processor 305 returns the parsed text to ingestion server 301.

Video processor 302 receives the parsed text from ingestion server 301 and sends a requests to video processing app 307. Video processing app 307 identifies objects in the video scene and uses the parsed text to label the objects. Video processing app 307 sends a response describing the scene (e.g., labeled objects) to video processor 302. Video processor then forwards the response to ingestion server 301. Ingestion server 301 sends the response to data merge process 308, which merges the response with the user's location, orientation, and map data. Data merge process 308 returns a response with a scene description to recorder 304 on the wearable multimedia device. For example, the response can include text describing the scene as the child's birthday party, including a map location and a description of objects in the scene (e.g., identify people in the scene). Recorder 304 associates the scene description with the multimedia data (e.g., using a streamid) stored on the wearable multimedia device. When the user recalls the data, the data is enriched with the scene description.

In some implementations, data merge process 308 may use more than just location and map data. There can also be a notion of ontology. For example, the facial features of the user's Dad captured in an image can be recognized by the cloud computing platform, and be returned as "Dad" rather than the user's name, and an address such as "555 Main Street, San Francisco, CA" can be returned as "Home." The ontology can be specific to the user and can grow and learn from the user's input.

Example Transportation Application

Figure 4:
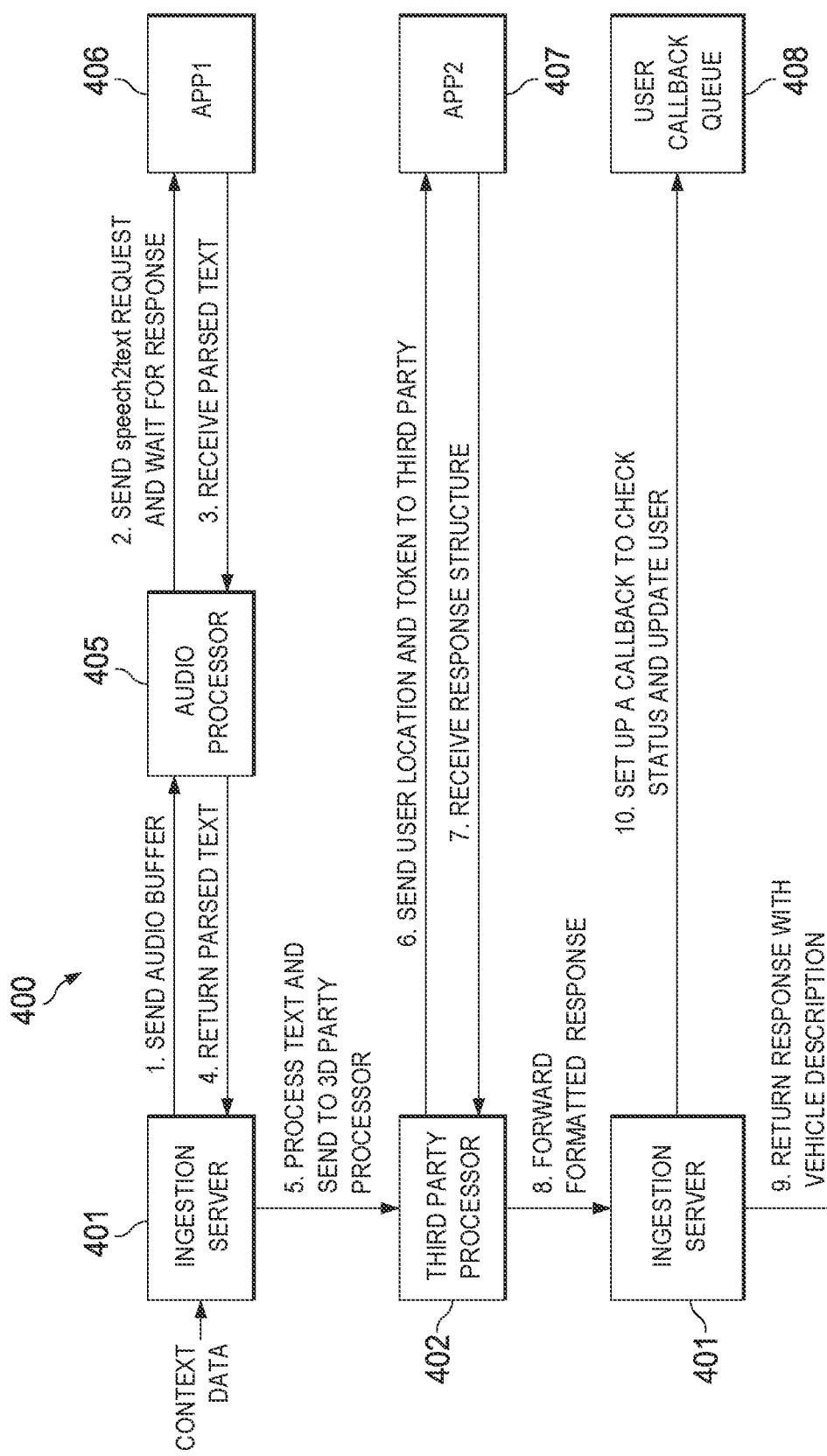
FIG. 4 is a block diagram of another data processing for processing a context data stream for a transportation application, according to some implementations of this disclosure.

FIG. 4 is a block diagram of another data processing for processing a context data stream for a transportation application, according to some implementations. In such implementations, data processing pipeline 400 is created to call a transportation company (e.g., Uber®, Lyft®) to get a ride home. Context data from a wearable multimedia device is received by ingestion server 401 and an audio stream from an audio buffer 203 is sent to audio processor 405. Audio processor 405 sends the audio stream to app 406, which converts the speech to text. The parsed text is returned to audio processor 405, which returns the parsed text to ingestion server 401 (e.g., a user speech request for transportation). The processed text is sent to third party processor 402. Third party processor 402 sends the user location and a token to a third party application 407 (e.g., Uber® or Lyft™® application). In some implementations, the token is an API and authorization token used to broker a request on behalf of the user. Application 407 returns a response data structure to third party processor 402, which is forwarded to ingestion server 401. Ingestion server 401 checks the ride arrival status (e.g., ETA) in the response data structure and sets up a callback to the user in user callback queue 408. Ingestion server 401 returns a response with a vehicle description to recorder 404, which can be spoken to the user by a digital assistant through a loudspeaker on the wearable multimedia device, or through the user's headphones or earbuds via a wired or wireless connection.

Figure 5:
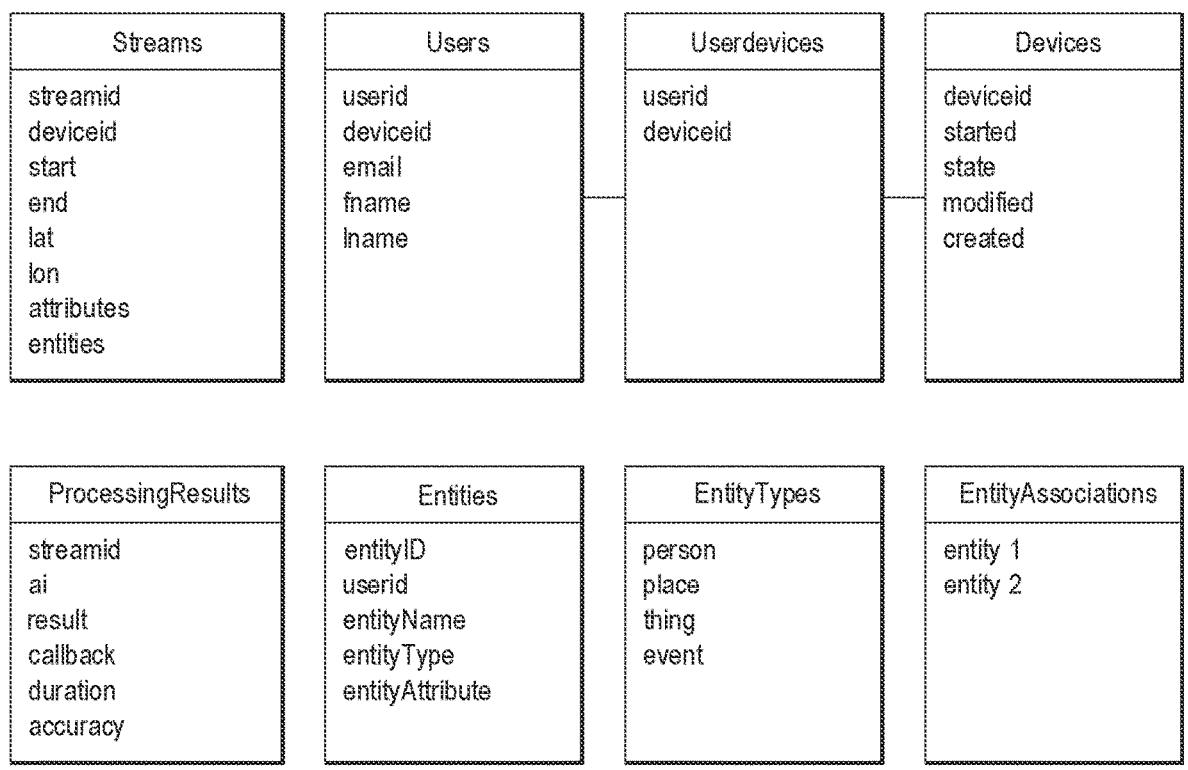
FIG. 5 illustrates data objects used by the data processing system of FIG. 2, according to some implementations of this disclosure.

FIG. 5 illustrates data objects used by the data processing system of FIG. 2, according to some implementations. The data objects are part of software component infrastructure instantiated on the cloud computing platform. A "streams" object includes the data streamid, deviceid, start, end, lat, lon, attributes and entities. "Streamid" identifies the stream (e.g., video, audio, photo), "deviceid" identifies the wearable multimedia device (e.g., a mobile device ID), "start" is the start time of the context data stream, "end" is the end time of the context data stream, "lat" is the latitude of the wearable multimedia device, "lon" is the longitude of the wearable multimedia device, "attributes" include, for example, birthday, facial points, skin tone, audio characteristics, address, phone number, etc., and "entities" make up an ontology. For example, the name "John Do" would be mapped to "Dad" or "Brother" depending on the user.

A "Users" object includes the data userid, deviceid, email, fname and lname. Userid identifies the user with a unique identifier, deviceid identifies the wearable device with a unique identifier, email is the user's registered email address, fname is the user's first name and lname is the user's last name. A "Userdevices" object includes the data userid and deviceid. A "devices" object includes the data deviceid, started, state, modified and created. In some implementations, deviceid is a unique identifier for the device (e.g., distinct from a MAC address). Started is when the device was first started. State is on/off/sleep. Modified is the last modified date, which reflects the last state change or operating system (OS) change. Created is the first time the device was turned on.

A "ProcessingResults" object includes the data streamid, ai, result, callback, duration an accuracy. In some implementations, streamid is each user stream as a Universally Unique Identifier (UUID). For example, a stream that was started from 8:00 AM to 10:00 AM will have id:15h158dhb4 and a stream that starts from 10:15 AM to 10:18 AM will have a UUID that was contacted for this stream. AI is the identifier for the platform application that was contacted for this stream. Result is the data sent from the platform application. Callback is the callback that was used (versions can change hence the callback is tracked in case the platform needs to replay the request). Accuracy is the score for how accurate the result set is. In some implementations, processing results can be used for multiple tasks, such as 1) to inform the merge server of the full set of results, 2) determine the fastest AI so that user experience can be enhanced, and 3) determine the most accurate ai. Depending on the use case, one may favor speed over accuracy or vice versa.

An "Entities" object includes the data entityID, userID, entityName, entityType and entityAttribute. EntityID is a UUID for the entity and an entity having multiple entries where the entityID references the one entity. For example, "Barack Obama" would have an entityID of 144, which could be linked in an associations table to POTUS44 or "Barack Hussein Obama" or "President Obama." UserID identifies the user that the entity record was made for. EntityName is the name that the userID would call the entity. For example, Malia Obama's entityName for entityID 144 could be "Dad" or "Daddy." EntityType is a person, place or thing. EntityAttribute is an array of attributes about the entity that are specific to the userID's understanding of that entity. This maps entities together so that when, for example, Malia makes the speech query: "Can you see Dad?", the cloud computing platform can translate the query to Barack Hussein Obama and use that in brokering requests to third parties or looking up information in the system.

Example Processes

Figure 6:
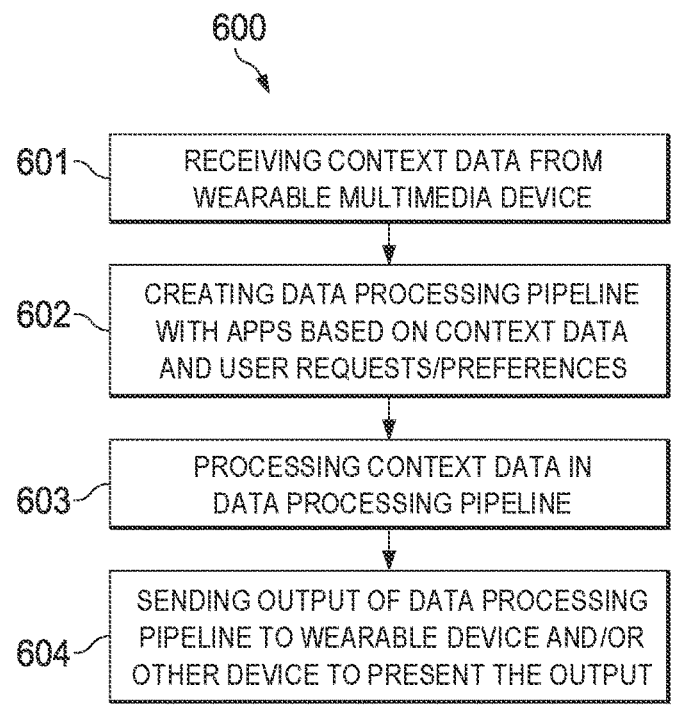
FIG. 6 is flow diagram of a data pipeline process, according to some implementations of this disclosure.

FIG. 6 is flow diagram of a data pipeline process, according to some implementations. Process 600 can be implemented using wearable multimedia devices 101 and cloud computing platform 102 described in reference to FIGS. 1-5.

Process 600 can begin by receiving context data from a wearable multimedia device (601). For example, the context data can include video, audio and still images captured by a camera and audio subsystem of the wearable multimedia device.

Process 600 can continue by creating (e.g., instantiating) a data processing pipeline with applications based on the context data and user requests/preferences (602). For example, based on user requests or preferences, and also based on the data type (e.g., audio, video, photo), one or more applications can be logically connected to form a data processing pipeline to process the context data into a presentation to be playback on the wearable multimedia device or another device.

Process 600 can continue by processing the context data in the data processing pipeline (603). For example, speech from user commentary during a moment or transaction can be converted into text, which is then used to label objects in a video clip.

Process 600 can continue by sending the output of the data processing pipeline to the wearable multimedia device and/or other playback device (604).

Example Cloud Computing Platform Architecture

Figure 7:
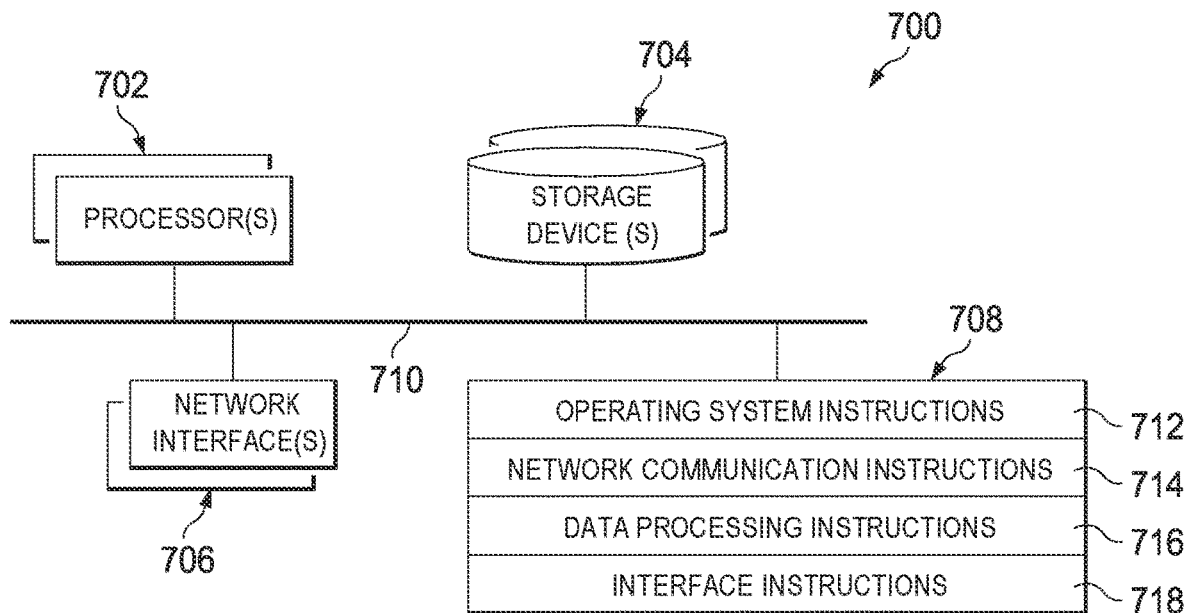
FIG. 7 is an architecture for the cloud computing platform, according to some implementations of this disclosure.

FIG. 7 is an example architecture 700 for cloud computing platform 102 described in reference to FIGS. 1-6, according to some implementations. Other architectures are possible, including architectures with more or fewer components. In some implementations, architecture 700 includes one or more processor(s) 702 (e.g., dual-core Intel® Xeon® Processors), one or more network interface(s) 706, one or more storage device(s) 704 (e.g., hard disk, optical disk, flash memory) and one or more computer-readable medium(s) 708 (e.g., hard disk, optical disk, flash memory, etc.). These components can exchange communications and data over one or more communication channel(s) 710 (e.g., buses), which can utilize various hardware and software for facilitating the transfer of data and control signals between components.

The term "computer-readable medium" refers to any medium that participates in providing instructions to processor(s) 702 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium(s) 708 can further include operating system 712 (e.g., Mac OS® server, Windows® NT server, Linux Server), network communication module 714, interface instructions 718, and data processing instructions 716.

Operating system 712 can be multi-user, multiprocessing, multitasking, multithreading, real time, etc. Operating system 712 performs basic tasks, including but not limited to: recognizing input from and providing output to processors/devices 702, 704, 706 and 708; keeping track and managing files and directories on computer-readable medium(s) 708 (e.g., memory or a storage device); controlling peripheral devices; and managing traffic on the one or more communication channel(s) 710. Network communications module 714 includes various components for establishing and maintaining network connections (e.g., software for implementing communication protocols, such as TCP/IP, HTTP, etc.) and for creating a distributed streaming platform using, for example, Apache Kafka™. Data processing instructions 716 include server-side or backend software for implementing the server-side operations, as described in reference to FIGS. 1-6. Interface instructions 718 includes software for implementing a web server and/or portal for sending and receiving data to and from wearable multimedia devices 101, third party application developers 104 and third party platforms 105, as described in reference to FIG. 1.

Architecture 700 can be included in any computer device, including one or more server computers in a local or distributed network each having one or more processing cores. Architecture 700 can be implemented in a parallel processing or peer-to-peer infrastructure or on a single device with one or more processors. Software can include multiple software components or can be a single body of code.

Example Wearable Multimedia Device Architecture

Figure 8:
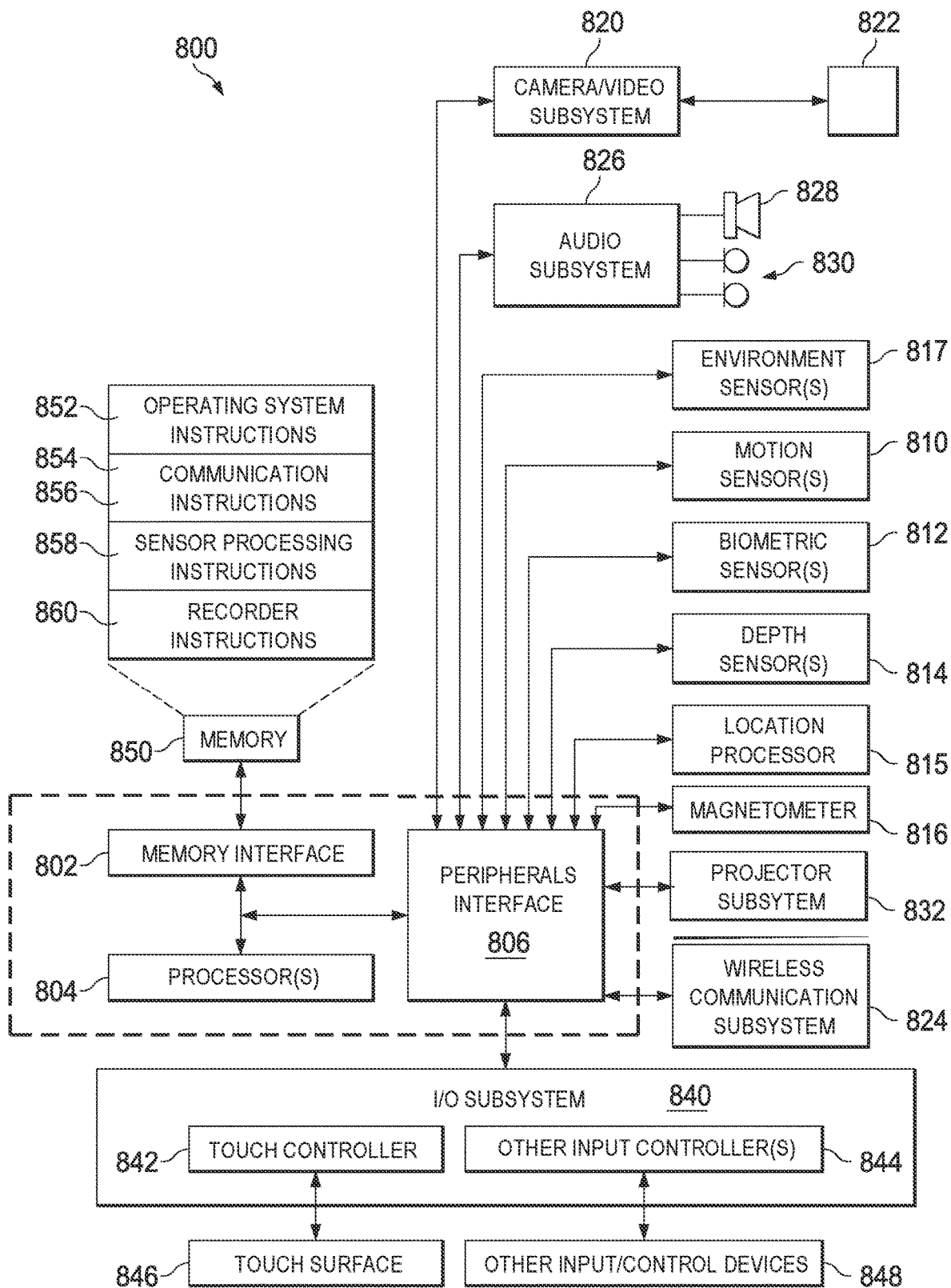
FIG. 8 is an architecture for the wearable multimedia device, according to some implementations of this disclosure.

FIG. 8 is a block diagram of example architecture 800 for a wearable multimedia device implementing the features and processes described in reference to FIGS. 1-6. Architecture 800 may include memory interface 802, data processor(s), image processor(s) or central processing unit(s) 804, and peripherals interface 806. Memory interface 802, processor(s) 804 or peripherals interface 806 may be separate components or may be integrated in one or more integrated circuits. One or more communication buses or signal lines may couple the various components.

Sensors, devices, and subsystems may be coupled to peripherals interface 806 to facilitate multiple functions. For example, motion sensor(s) 810, biometric sensor(s) 812, and depth sensor(s) 814 may be coupled to peripherals interface 806 to facilitate motion, orientation, biometric, and depth detection functions. In some implementations, motion sensor(s) 810 (e.g., an accelerometer, rate gyroscope) may be utilized to detect movement and orientation of the wearable multimedia device.

Other sensors may also be connected to peripherals interface 806, such as environmental sensor(s) (e.g., temperature sensor, barometer, ambient light) to facilitate environment sensing functions. For example, a biometric sensor can detect fingerprints, face recognition, heart rate and other fitness parameters. In some implementations, a haptic motor (not shown) can be coupled to the peripheral interface, which can provide vibration patterns as haptic feedback to the user.

Location processor 815 (e.g., GNSS receiver chip) may be connected to peripherals interface 806 to provide geo-referencing. Electronic magnetometer 816 (e.g., an integrated circuit chip) may also be connected to peripherals interface 806 to provide data that may be used to determine the direction of magnetic North. Thus, electronic magnetometer 816 may be used by an electronic compass application.

Camera subsystem 820 and an optical sensor 822, e.g., a charged coupled device (CCD) or a complementary metal-oxide semiconductor (CMOS) optical sensor, may be utilized to facilitate camera functions, such as recording photographs and video clips. In some implementations, the camera has a 180° FOV and OIS. The depth sensor can include an infrared emitter that projects dots in a known pattern onto an object/subject. The dots are then photographed by a dedicated infrared camera and analyzed to determine depth data. In some implementations, a time-of-flight (TOF) camera can be used resolve distance based on the known speed of light and measuring the time-of-flight of a light signal between the camera and an object/subject for each point of the image.

Communication functions may be facilitated through one or more communication subsystems 824. Communication subsystem(s) 824 may include one or more wireless communication subsystems. Wireless communication subsystems 824 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data (e.g., a projector).

The specific design and implementation of the communication subsystem 824 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., Wi-Fi, WiMax, ZigBee™), 3G, 4G, 4G LTE, code division multiple access (CDMA) networks, near field communication (NFC), Wi-Fi Direct and a Bluetooth™ network. Wireless communication subsystems 824 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 826 may be coupled to a speaker 828 and one or more microphones 830 to facilitate voice-enabled functions, such as voice recognition, voice replication, digital recording, telephony functions and beamforming.

I/O subsystem 840 may include touch controller 842 and/or another input controller(s) 844. Touch controller 842 may be coupled to a touch surface 846. Touch surface 846 and touch controller 842 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 846. In one implementation, touch surface 846 may display virtual or soft buttons, which may be used as an input/output device by the user.

Other input controller(s) 844 may be coupled to other input/control devices 848, such as one or more buttons, rocker switches, thumb-wheel, infrared port, USB port, and/or a pointer device such as a stylus. The one or more buttons (not shown) may include an up/down button for volume control of speaker 828 and/or microphone 830.

Further, a projector subsystem 832 may be connected to peripherals interface 806 to present information visually to a user in the form of projected light. For example, the projector subsystem 832 can project light onto a surface according to a particular spatial and/or temporal pattern, such that the user perceives text, images, videos, colors, patterns, and/or any other graphical information on the surface. In some implementations, the projector subsystem 832 can project light onto a surface of the user's body, such as the user's hand or palm. In some implementations, the projector subsystem 832 can project light onto a surface other than the user's body, such as a wall, a table, a desk, or any other object. The projector subsystem 832 is described in greater detail with reference to FIG. 9.

In some implementations, the projector subsystem 832 project light onto a surface to provide an interactive VI for a user. For example, the projector subsystem 832 can project light onto the surface, such that the user perceives one or more interactive user interface elements (e.g., selectable buttons, dials, switches, boxes, images, videos, text, icons, etc.). Further, the user can interact with the VI by performing one or more gestures with respect to the VI and the user interface elements. For example, the user can perform a pointing gesture, a tapping gesture, a swiping gesture, a waving gesture, or any other gesture using her hands and/or fingers. The wearable multimedia device can detect the performed gestures using one or more sensors (e.g., the camera/video subsystems 820, environment sensor(s) 817, depth sensor(s) 814, etc.), identify one or more commands associated with those gestures, and execute the identified commands (e.g., using the processor(s) 804). Example VIs are described in further detail below.

In some implementations, a device including architecture 800 plays back to a user recorded audio and/or video files (including spatial audio), such as MP3, AAC, spatial audio and MPEG video files. In some implementations, the device including architecture 800 may include the functionality of an MP3 player and may include a pin connector or other port for tethering to other devices. Other input/output and control devices may be used. In some implementations, the device including architecture 800 may include an audio processing unit for streaming audio to an accessory device over a direct or indirect communication link.

Memory interface 802 may be coupled to memory 850. Memory 850 may include high-speed random access memory or non-volatile memory, such as one or more magnetic disk storage devices, one or more optical storage devices, or flash memory (e.g., NAND, NOR). Memory 850 may store operating system 852, such as Darwin, RTXC, LINUX, UNIX, OS X, iOS, WINDOWS, or an embedded operating system such as VxWorks. Operating system 852 may include instructions for handling basic system services and for performing hardware dependent tasks. In some implementations, operating system 852 may include a kernel (e.g., UNIX kernel).

Memory 850 may also store communication instructions 854 to facilitate communicating with one or more additional devices, one or more computers or servers, including peer-to-peer communications with wireless accessory devices, as described in reference to FIGS. 1-6. Communication instructions 854 may also be used to select an operational mode or communication medium for use by the device, based on a geographic location of the device.

Memory 850 may include sensor processing instructions 858 to facilitate sensor-related processing and functions and recorder instructions 860 to facilitate recording functions, as described in reference to FIGS. 1-6. Other instructions can include GNSS/Navigation instructions to facilitate GNSS and navigation-related processes, camera instructions to facilitate camera-related processes and user interface instructions to facilitate user interface processing, including a touch model for interpreting touch inputs.

Each of the above identified instructions and applications may correspond to a set of instructions for performing one or more functions described above. These instructions need not be implemented as separate software programs, procedures, or modules. Memory 850 may include additional instructions or fewer instructions. Furthermore, various functions of the device may be implemented in hardware and/or in software, including in one or more signal processing and/or application specific integrated circuits (ASICs).

Figure 9:
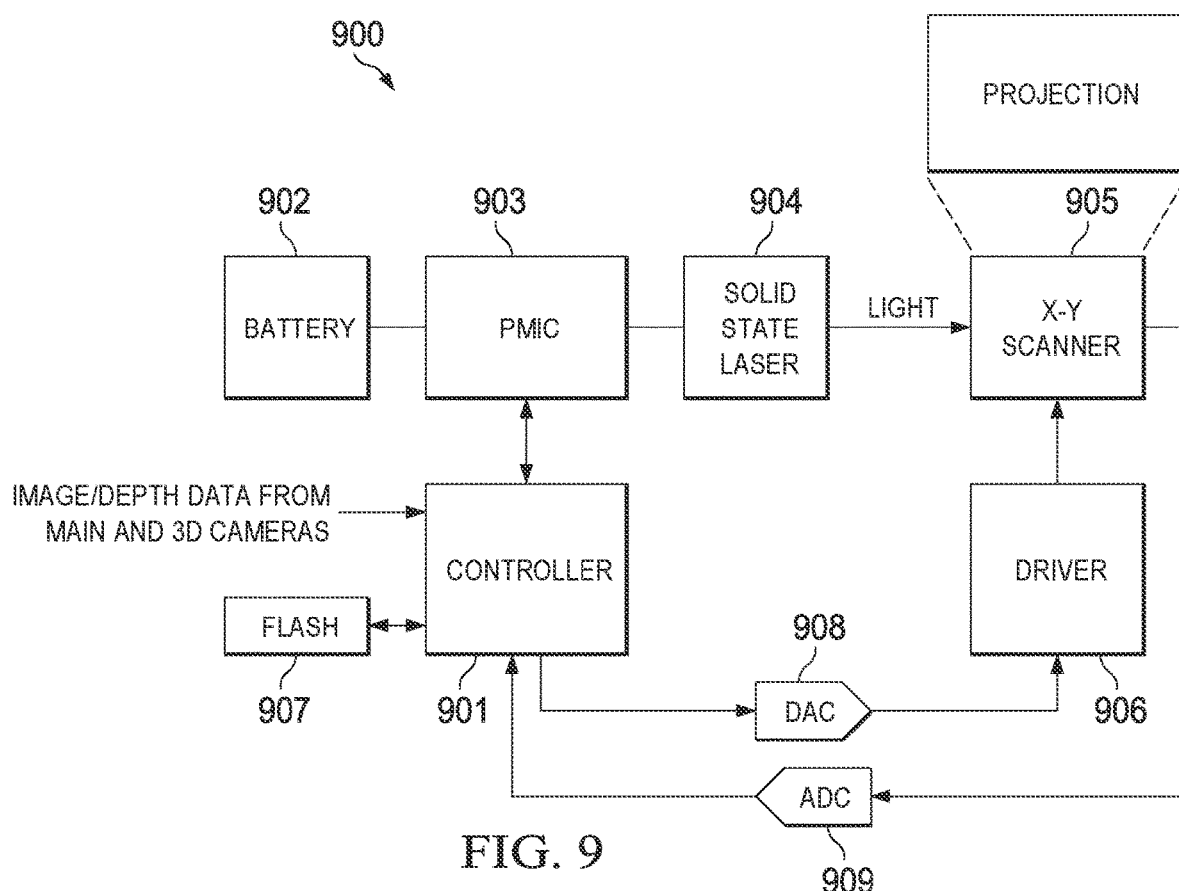
FIG. 9 is a system block diagram of a projector architecture, according to some implementations of this disclosure.

FIG. 9 is a system block diagram of the projector subsystem 832, according to some implementations. The projector subsystem 832 scans a pixel in two dimensions, images a 2D array of pixels, or mixes imaging and scanning. Scanning projectors directly utilize the narrow divergence of laser beams, and two-dimensional (2D) scanning to "paint" an image pixel by pixel. In some implementations, separate scanners are used for the horizontal and vertical scanning directions. In other implementations, a single biaxial scanner is used. The specific beam trajectory also varies depending on the type of scanner used.

In the example shown, the projector subsystem 832 is a scanning pico-projector that includes controller 901, battery 902, power management chip (PMIC) 903, solid state laser 904, X-Y scanner 905, driver 906, memory 907, digital-to-analog converter (DAC) 908 and analog-to-digital converter (ADC) 909.

Controller 901 provides control signals to X-Y scanner 905. X-Y scanner 905 uses moveable mirrors to steer the laser beam generated by solid state laser 904 in two dimensions in response to the control signals. X-Y scanner 905 includes one or more micro-electromechanical (MEMS) micromirrors that have controllable tilt angles in one or two dimensions. Driver 906 includes a power amplifier and other electronic circuitry (e.g., filters, switches) to provide the control signals (e.g., voltages or currents) to X-Y scanner 905. Memory 907 stores various data used by the projector including laser patterns for text and images to be projected. DAC 908 and ADC 909 provide data conversion between digital and analog domains. PMIC 903 manages the power and duty cycle of solid state laser 904, including turning on and shutting of solid state laser 904 and adjusting the amount of power supplied to solid state laser 904. Solid state laser 904 can be, for example, a vertical-cavity surface-emitting laser (VCSEL).

In some implementations, controller 901 uses image data from the camera/video subsystem 820 and/or depth data from the depth sensor(s) 814 to recognize and track user hand and/or finger positions on the laser projection, such that user input is received by the wearable multimedia device 101 using the laser projection as an input interface.

In other implementations, instead or additionally, the projector subsystem 832 uses a vector-graphic projection display and low-powered fixed MEMS micromirrors to conserve power. Because the projector subsystem 832 includes a depth sensor, the projected area can be masked when needed to prevent projecting on a finger/hand interacting with the laser projected image. In some implementations, the depth sensor can also track gestures to control the input on another devices (e.g., swiping through images on a TV screen, interacting with computers, smart speakers, etc.).

In some implementations, Liquid Crystal on Silicon (LCoS or LCOS), Digital Light Processing (DLP) or Liquid Chrystal Display (LCD) digital projection technology can be used instead of a pico-projector.

Example Virtual Interfaces

As described above, a wearable multimedia device 101 can include a projector subsystem 832 configured to present information visually to a user in the form of projected light. For example, the projector subsystem 832 can project light onto a surface (e.g., a surface of a user's hand, such as the user's palm) according to a particular spatial and/or temporal pattern, such that the user perceives a VI with one or more user interface elements. In some implementations, a VI and/or the user interface elements can include any combination of text, images, videos, colors, patterns, shapes, lines, or any other graphical information.

Further, the user can perform gestures to interact with the VI. For instance, the user can perform one or more gestures directed at one or more of the user interface elements. As examples, the user can point to a user interface element, touch or tap a user interface element using her finger (e.g., a single time, or multiple times in a sequence), perform a swiping motion along a user interface element using her finger, wave at a user interface element using her hand, hover over the user interface element, or perform any other hand or finger gesture. The wearable multimedia device 101 can detect the performed gestures using one or more sensors (e.g., the camera/video subsystems 820, environment sensor(s) 817, depth sensor(s) 814, etc.), identify one or more commands associated with those gestures, and execute the identified commands (e.g., using the processor(s) 804).

At least some of the user interface elements and/or commands can be used to control the operation of the wearable multimedia device 101. For example, at least some of the user interface elements and/or commands can be used to execute or control the generation of video and/or audio content, the viewing of content, the editing of content, the storing and transmission data, and/or any other operation described herein. In some implementations, a wearable multimedia device 101 can present a VI that allows a user to compose and send a message to one or more other users. This VI may also be referred to as a message composition interface.

Figure 10:
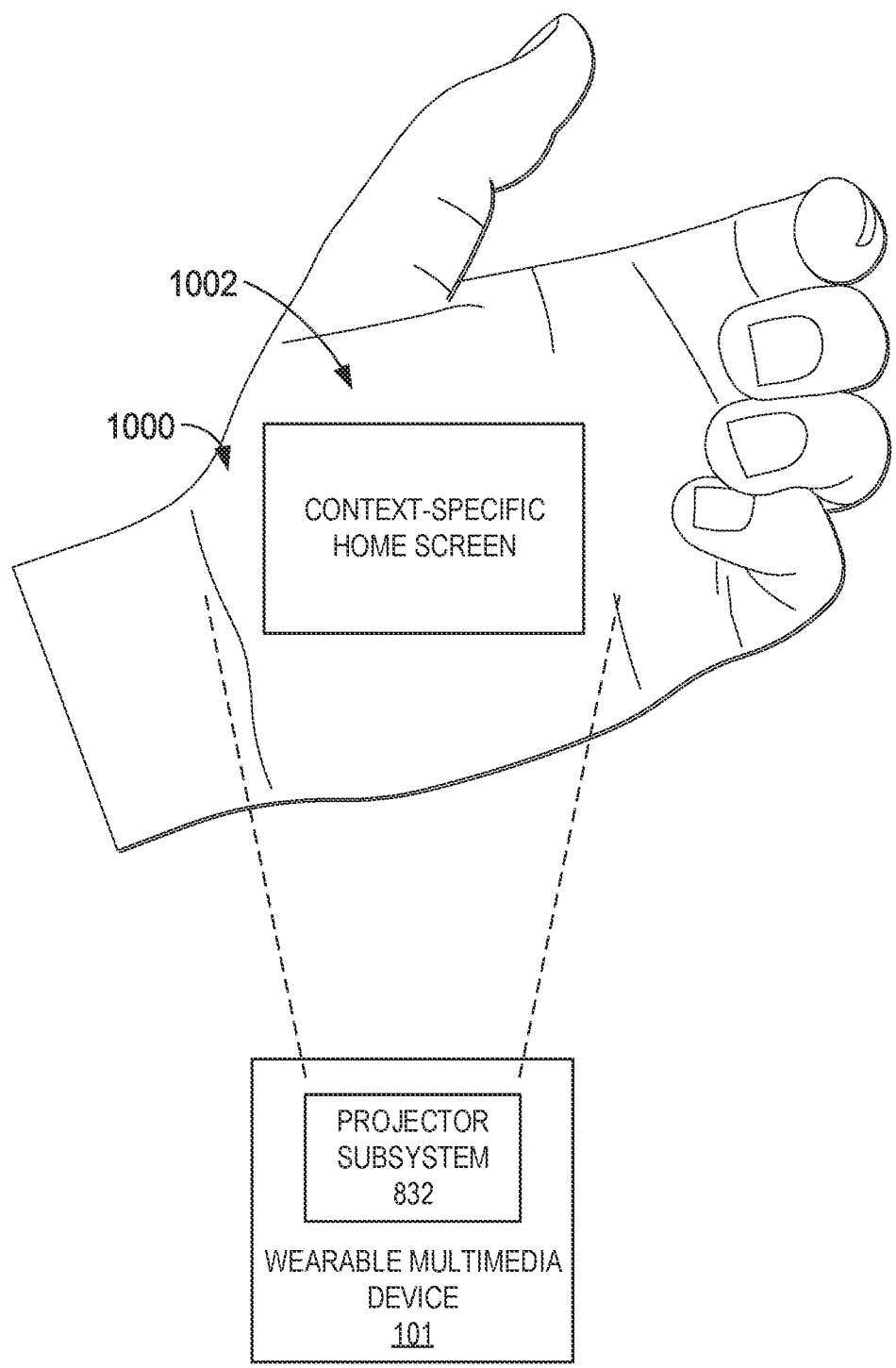
FIG. 10 is a diagram of an example of a virtual interface, according to some implementations of this disclosure.

As an illustrative example, FIG. 10 shows a context-sensitive home screen 1002 projected by a projector subsystem 832 onto a user's palm 1000. The context-sensitive home screen 1002 presents content that is determined to be relevant based on current context data, such as context data indicating a location of the wearable multimedia device 101 projecting the context-sensitive home screen 1002.

Example Context-Sensitive Home Screens

Figure 11:
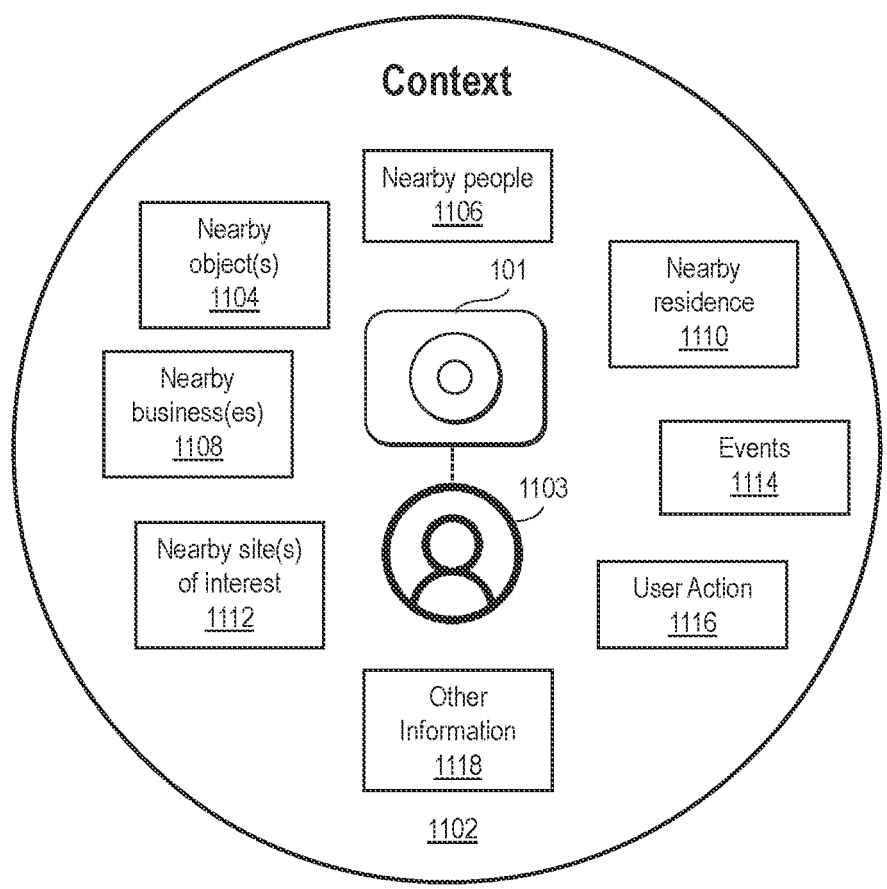
FIG. 11 is a diagram illustrating examples of types of context data, according to some implementations of this disclosure.

FIG. 11 shows various types of context data 1102 that can be determinative of what content to present in a context-sensitive home screen. Context data 1102 describes a context of one or both of (i) a wearable multimedia device 101 itself, or (ii) a user 1103 of the wearable multimedia device 101. For example, context data 1102 can describe an environment of the wearable multimedia device 101. Because the user 1103 is a user of the wearable multimedia device 101, references to the context of the wearable multimedia device 101 include context data describing context of the user 1103.

In some implementations the context data 1102 includes location data based on a location of the wearable multimedia device 101. For example, the location data can indicate one or more entities in proximity to the wearable multimedia device 101, such as one or more nearby objects 1104, one or more nearby businesses 1108, a nearby residence 1110 associated with the user 1103, one or more nearby sites of interest 1112, or another type of entity. Identification of nearby entities and humans is described below with respect to FIG. 12.

Nearby objects 1104 can include, for example, consumer items, such as a kitchen appliance, an item of clothing, a thermostat, a personal electronic device such as a computer or television, or another object. Nearby businesses 1108 can include businesses registered with or otherwise known to a content provision platform such as cloud computing platform 102 and/or a third party platform 105. A nearby residence 1110 can include a determined residence of the user 1103, such as a residence that the user 1103 has indicated or a location that is determined to be the residence of the user 1103 based on location patterns of the wearable multimedia device 101. Nearby sites of interest 1112 can include other locations that may provide relevant context for determining the relevance of content to present, such as parks, shopping districts, mass transit stations, museums, schools, libraries, government offices, memorials and monuments, and any other suitable type of context-providing site.

In some implementations, an entity is determined to be in proximity to the wearable multimedia device 101 when the entity is within a threshold distance from the wearable multimedia device 101, where the threshold distance can be the same across entity types or can be different for different entity types. In some implementations, instead of or in addition to a threshold determination, entities' distances from the wearable multimedia device 101 can be used as weighting parameters when the entities are used in context data to determine relevance scores for different content, as described below in reference to FIG. 13C. For example, in some implementations, if a user is five meters from a first entity and twenty meters from a second entity, both the first entity and the second entity can be included in context data for relevance score determination, but the first entity can be weighted more heavily in a calculation of the relevance score (e.g., can be weighted more heavily when being input into a content scoring model 1604). In some implementations, the distances themselves are used to determine relevance scores. For example, context data can include location data in a form such as (entity, distance), where distance indicates the distance between the entity and the wearable multimedia device 101. In the immediately preceding example, the context data would include (first entity, 5) and (second entity, 20).

In some implementations, the context data 1102 indicates one or more people 1106 in proximity to the wearable multimedia device 101. The people 1106 can include people associated with the user 1103 in one or more ways, such as people who have a relationship with the user 1103 on social media, people whose contact information is stored in a contact list of the user 1103 (e.g., stored on the wearable multimedia device 101), people who have communicated with the user 1103 in the past, people who have a shared calendar event with the user 1103, or people with another association with the user 1103, in various implementations. Proximity between the people 1106 and the wearable multimedia device 101 can be determined as described above for entities, e.g., using a threshold distance, using distance-based weighting, and/or by including the distance in the context data 1102.

In some implementations, the context data 1102 includes one more events 1114. The one or more events 1114 can include currently-occurring events and/or upcoming events. In some implementations, in a manner analogous to that described for location proximity, an event can be included in the context data 1102 when the event is occurring within a threshold time period from a current time, the event can be weighted more strongly than another event in relevance score determination when the event will occur at a future time point before the other event, and/or a time of the event (e.g., in relation to a current time) can be included in the context data 1102. Events can be specific to the user 1103 or shared with one or more other users. Examples of events can include medical appointments, flights, social events, and holidays.

In some implementations, the context data 1102 includes one or more actions 1116 currently being performed by the user 1103. For example, the actions 1116 can include a navigation activity such as driving, a shopping activity, a home activity such as cooking, playing a game, or watching television, or any other type of activity that can be identified by the wearable multimedia device 101 or by cloud computing platform 102, as described in more detail below.

In some implementations, the context data 1102 instead or additionally includes other suitable types of information 1118. For example, the other information 1118 can include demographic information describing the user 1103; sensor data captured by the wearable multimedia device 101 besides location-related data, such as heart rate data and motion data; weather data describing weather in the vicinity of the wearable multimedia device 101; or any other suitable type of data that could help determine the relevance of different content. as described throughout this disclosure.

Figure 12:
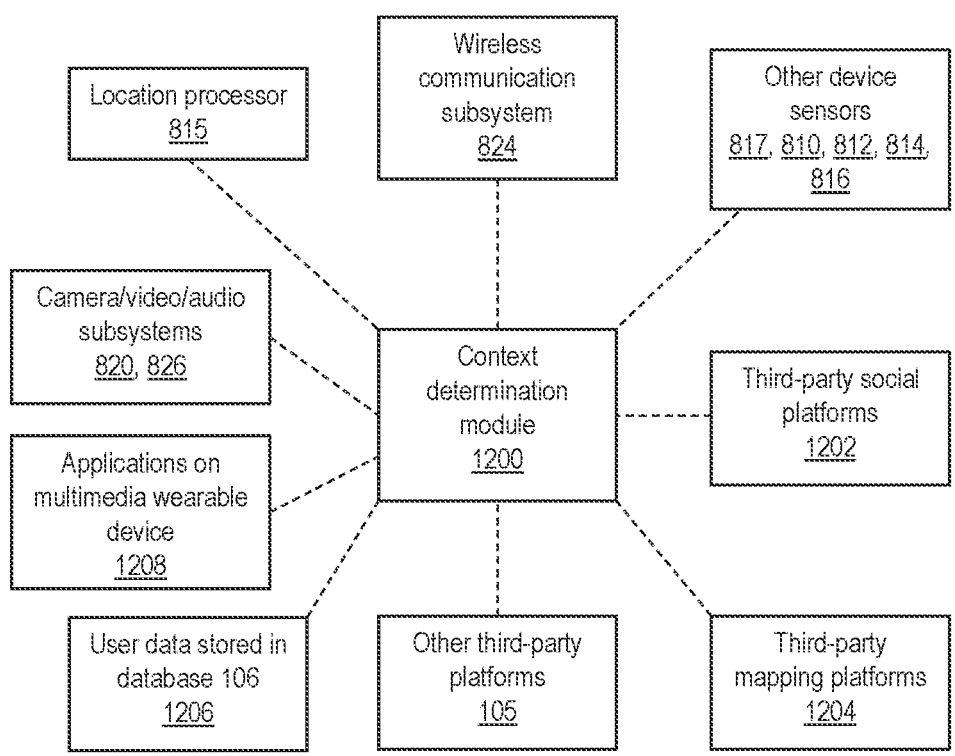
FIG. 12 is a diagram illustrating examples of data sources for context data, according to some implementations of this disclosure.

FIG. 12 shows a context determination module 1200 that, in some implementations according to this disclosure, can draw upon available data sources and, in some implementations, analyze data from the data sources to obtain the context data 1102. The context determination module 1200 can be included in a wearable multimedia device 101 (e.g., as a computer program product stored in memory 850 for execution by processors 804), in the cloud computing platform 102 (e.g., as a computer program product stored in memory of the cloud computing platform 102 for execution by processors 702), and/or in a combination of the wearable multimedia device 101 and the cloud computing platform 102. Context determination module 1200 can access a diverse set of data sources to obtain the context data 1102.

In some implementations, the context data 1102 includes data from or derived from the camera/video subsystem 820 and/or the audio subsystem 826. For example, multimedia data streams of video (in some implementations, with audio) captured by the wearable multimedia device 101 can be obtained and analyzed to identify entities portrayed in the multimedia data streams. Computer vision techniques known in the art (e.g., machine learning-based object recognition techniques) can be used to identify signs, people, objects, and other entities. For example, in some implementations, the context determination module 1200 can determine that the user 1103 is looking at an identified product in a store; that the user 1103 is standing in front of an identified storefront; that the user 1103 is interacting with an identified appliance, device, or other object; or that the user 1103 is interacting with or in proximity with an identified person (e.g., based on facial recognition).

In some implementations, the context data 1102 includes location data from the location processor 815, the location data indicating a location of the wearable multimedia device 101 in absolute terms and/or in relation to one or more entities. For example, the location data can include GPS coordinates of the wearable multimedia device 101.

In some implementations, the context data 1102 includes data from the wireless communication subsystem 824, which can be used for various purposes. For example, cellular network information and/or wireless network information can be used as location data to determine a location of the wearable multimedia device 101, e.g., by cellular network triangulation or by association of Wi-Fi networks with locations. As another example, short-range wireless communication such as Bluetooth communication and NFC can be used to identify devices in a vicinity of the wearable multimedia device 101. For example, NFC can be used to identify a payment terminal in proximity to the wearable multimedia device 101, indicating that payment-related content should be presented. As another example, nearby mobile devices of other users can be identified by network communications to determine that the other users are in the vicinity of the wearable multimedia device 101.

In some implementations, the context data 1102 includes data from one or more other sensors of the wearable multimedia device 101, such as environment sensors 817, motion sensors 810, biometric sensors 812, depth sensors 814, and/or magnetometer 816. For example, the environment sensors 817 can be used to determine a light environment or weather environment of the wearable multimedia device 101. The motion sensors 810 can be used to determine that the user 1103 is exercising. The biometric sensors 812 can be used to determine a physical state of the user 1103 (e.g., heart rate). The depth sensors 814 can be used to obtain three-dimensional information, e.g., to supplement image/video data from the camera/video subsystem 820 with three-dimensional sensing for more accurate and/or complete information. The magnetometer 816 can be used to determine an orientation and/or direction of motion of the wearable multimedia device 101.

In some implementations, the context data 1102 includes social data from one or more third-party social platforms 1202 (e.g., included in third party platforms 105). The social data can include, for example, relationships between the user 1103 and other users (e.g., friends, businesses colleagues, relatives), who may be identified based on image/video data or network data; or can include events that the user 1103 is registered as attending; can indicate entities with whom the user 1103 has interacted or otherwise has a relationship with; and/or can include other suitable data types.

In some implementations, the context data 1102 includes data from one or more other third party platforms 105. For example, a calendar platform can provide events on the user 1103's calendar, and/or a banking or payment platform can provide information about recent transactions performed by the user 1103 or information about a state of the user 1103's finances.

In some implementations, the context data 1102 includes user data 1206 stored in the database 106, which can include any suitable user data relevant to context determination. For example, the user data 1206 can include demographic information of the user 1103, past content selections by the user 1103 (e.g., browsing history), past content preferences indicated by the user 1103 (e.g., selecting "this content is not relevant,"), or any other suitable type of user data.

In some implementations, the context data 1102 includes data from applications on the wearable multimedia device 1208. For example, a navigation application can provide data indicating that the user 1103 is in the process of driving between two locations, and a game application can providing data indicating that a daily game has just become available.

Figure 13A:
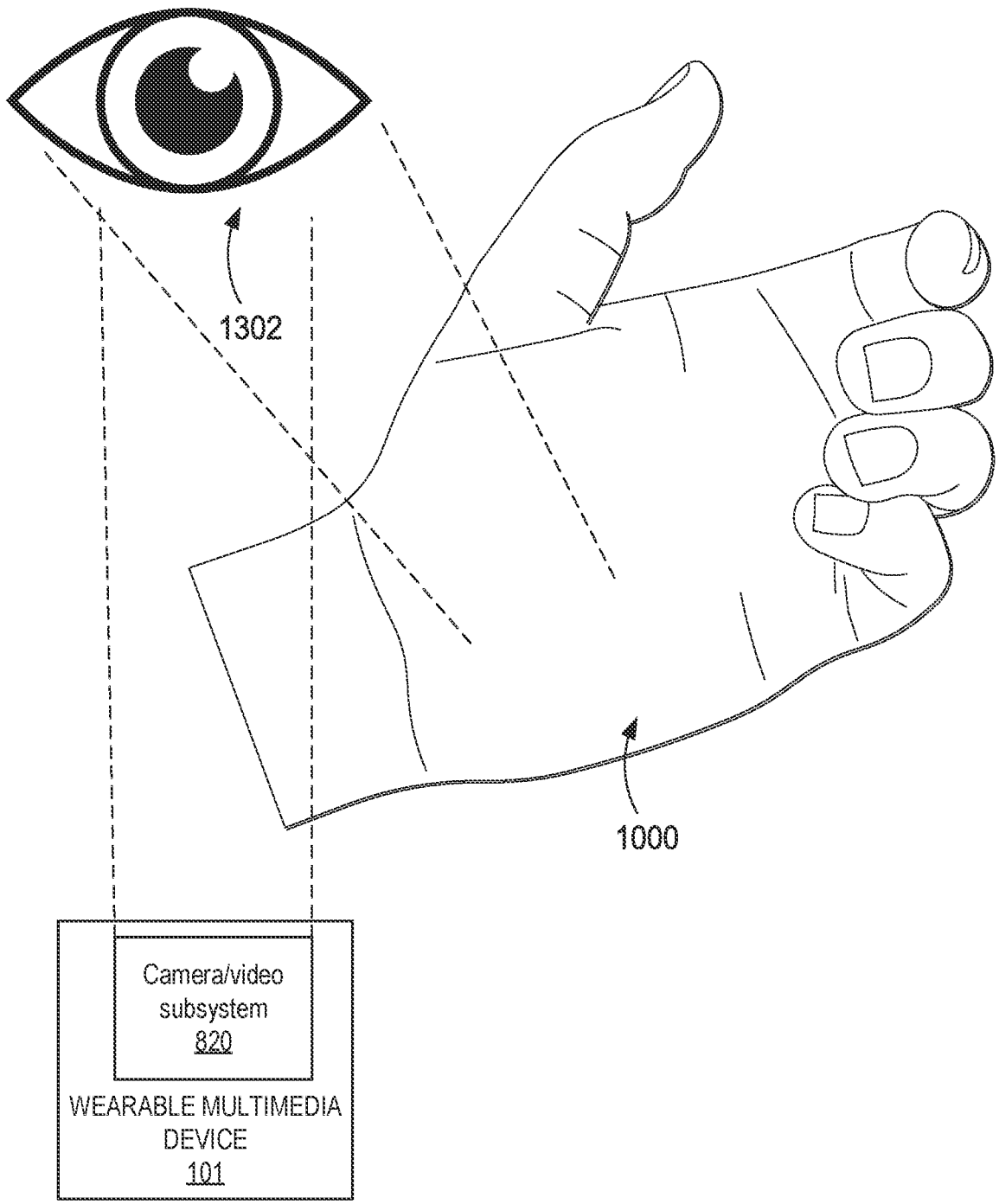
FIG. 13A is a diagram of an example of a waking interaction, according to some implementations of this disclosure.

FIGS. 13A-13D illustrate an example of a context-specific home screen determination and presentation process. As shown in FIG. 13A, a waking interaction with a wearable multimedia device 101 is detected. In this example, the waking interaction is the user's gaze 1302 being directed at the palm 1000 of the user 1103. The camera/video subsystem 820 tracks the gaze 1302, determines that the gaze 1302 is directed at the palm 1000, and identifies the gaze direction as a waking interaction. Other waking interactions are also within the scope of this disclosure, such as one or more motions/gestures by the user 1103, one or more inputs by the user 1103 using the touch controller 842, one or more audio inputs by the user 1103 (such as a phrase predetermined to wake the wearable multimedia device 101), or any other suitable interaction type that can be detected by the wearable multimedia device 101. For example, the waking interaction can include a known hand gesture that is detected by the camera/video subsystem 820 of the wearable multimedia device 101, and/or the waking interaction can include a known waking phrase that is detected by the audio subsystem 826 of the wearable multimedia device 101.

The waking interaction causes the wearable multimedia device 101 to switch from an inactive state to an active state. The inactive state can be, for example, an asleep state in which a display of the wearable multimedia device 101 is off or in which the wearable multimedia device 101 is not projecting a VI.

Figure 13B:
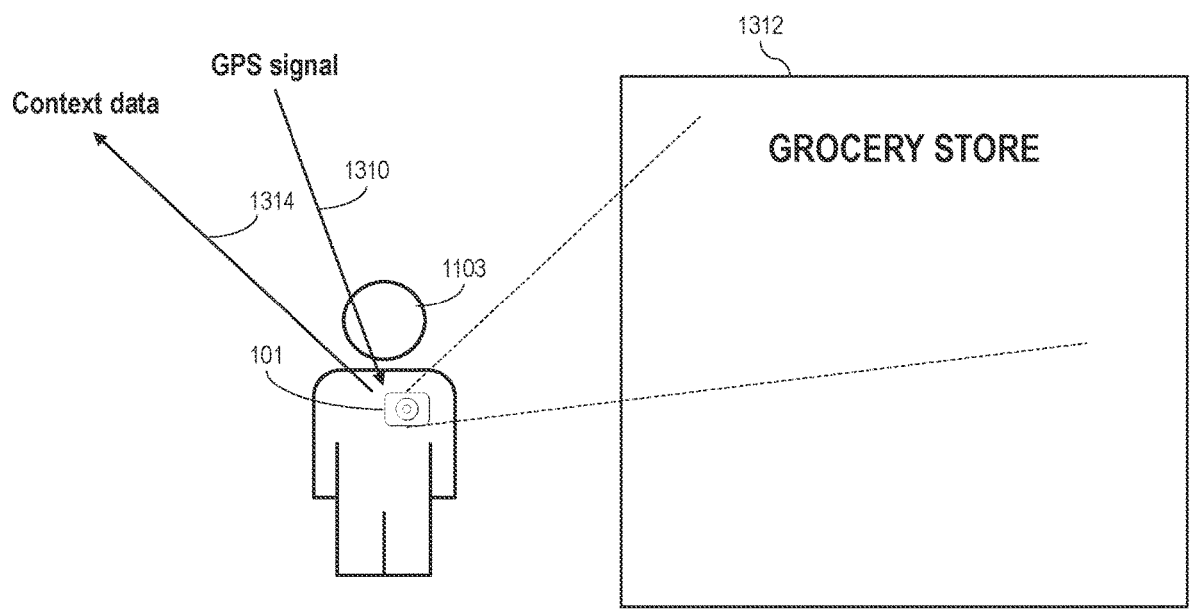
FIG. 13B is a diagram of an example of a context of a wearable multimedia device, according to some implementations of this disclosure.

As shown in FIG. 13B, context data 1314 is obtained. In this example, the context data 1314 includes an image of a grocery store 1312 captured by the wearable multimedia device 101, or location date indicated by a GPS signal 1310 received at the wearable multimedia device 101, or both. In some implementations, as shown in FIG. 13B, the context data 1314 is transmitted from the wearable multimedia device 101 to the cloud computing platform 102 for subsequent content relevance determination. In some implementations, content relevance determination is performed by the wearable multimedia device 101, and the context data 1314 may or may not be transmitted to the cloud computing platform 102.

Figure 13C:
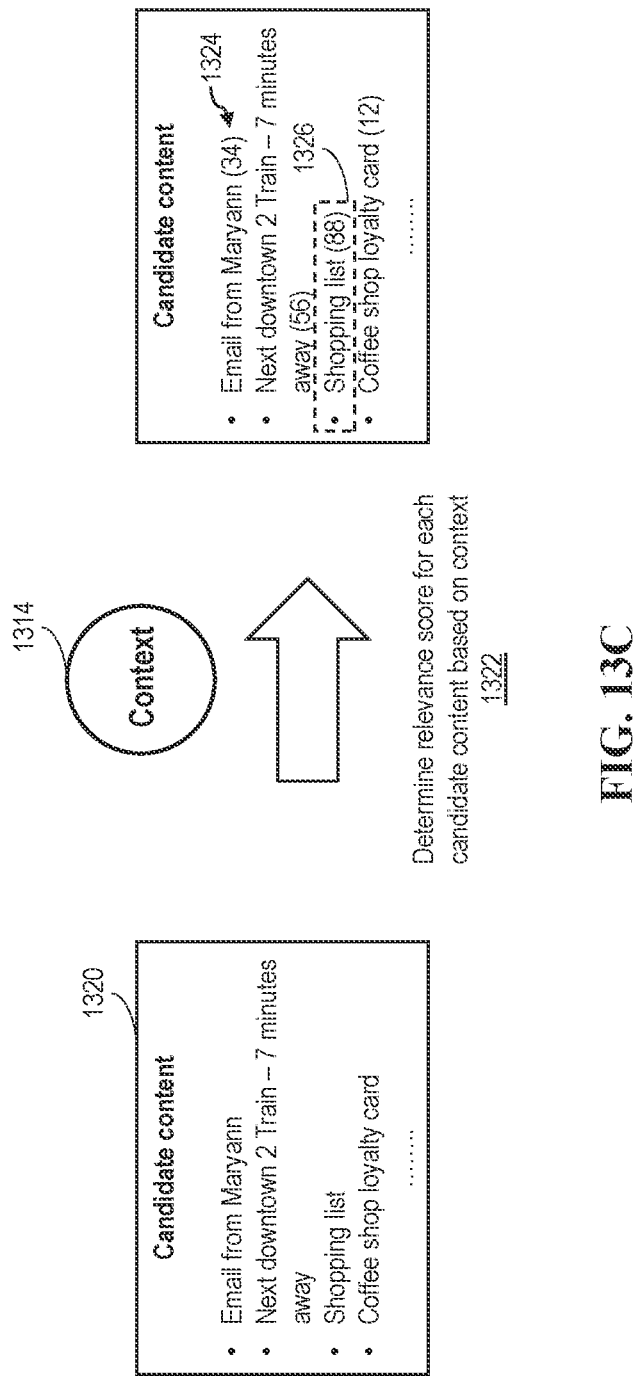
FIG. 13C is a diagram of an example of a relevance determination process, according to some implementations of this disclosure.

As shown in FIG. 13C, a set of candidate content 1320 includes possible content that can be included in a context-sensitive home screen. In this example, the set of candidate content 1320 includes an email, a transit schedule, a shopping list, and a coffee shop loyalty card (e.g., scannable code). Candidate content can be obtained from the wearable multimedia device 101, from the database 106, from one or more third party platforms 105, and/or from any other suitable source.

In a relevance determination process 1322, relevance scores are determined for each candidate content based on the candidate content and on the context data 1314. For example, the email is given a relevance score of 34 (indicated as element 1324), the transit schedule is given a relevance score of 56, the shopping list is given a relevance score of 88, and the loyalty card is given a relevance score of 12. In this example, higher relevance scores indicate more-relevant content. For example, the email from Maryann may be analyzed to determine that it is not urgent and does not have an association with the current context, so the email is given a somewhat low relevance score; the transit schedule is given a somewhat higher relevance score, because, as indicated by the context data 1314, a transit station is nearby and the user 1103 has an appointment to reach in 90 minutes; the coffee shop associated with the loyalty card is far from the current location of the wearable multimedia device 101, so the loyalty card is given a very low relevance score; and the shopping list is given a very high relevance score, because the user is in the vicinity of and facing the grocery store 1312.

Figure 13D:
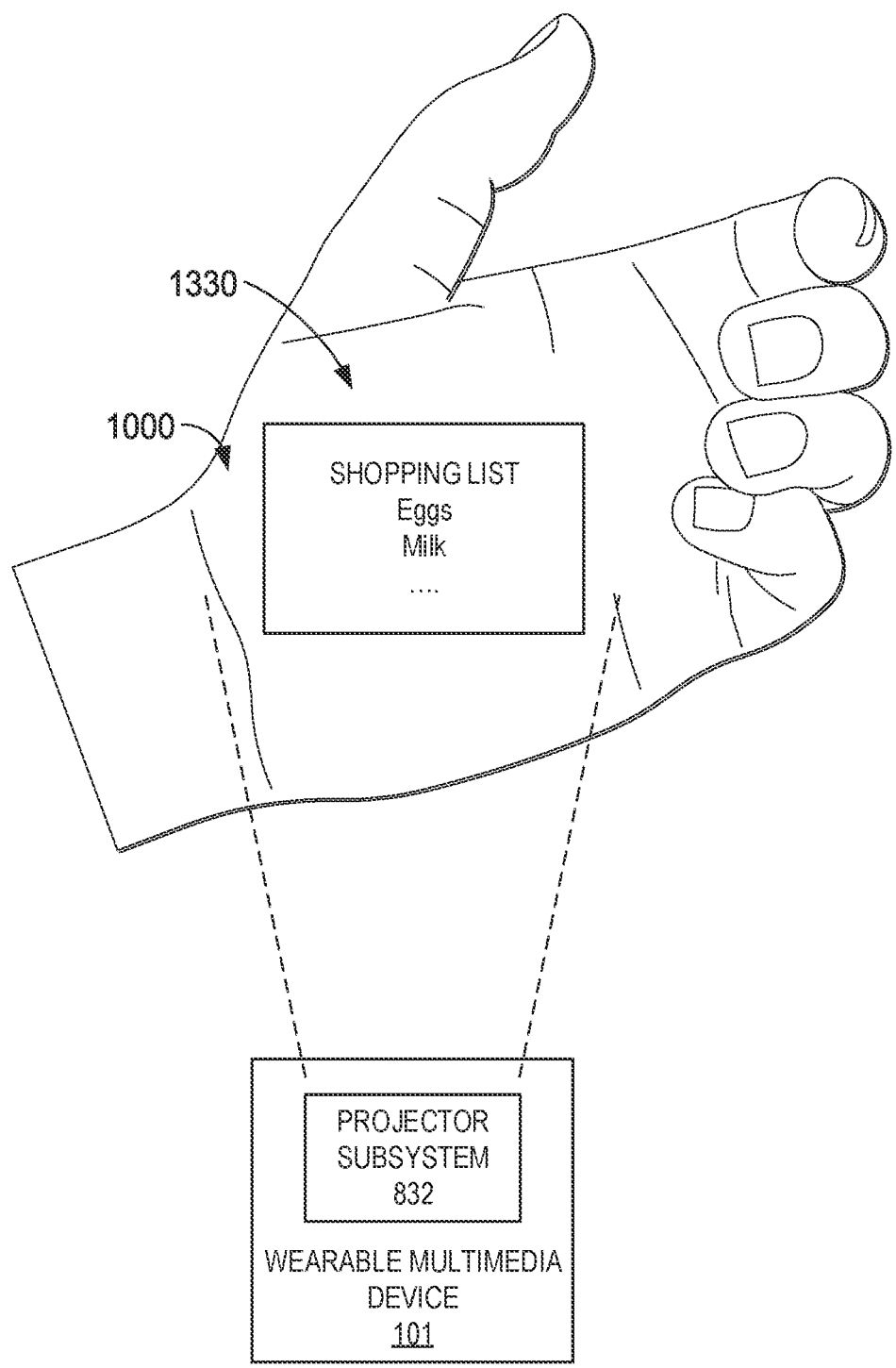
FIG. 13D is a diagram of an example of a presentation of a context-sensitive home screen, according to some implementations of this disclosure.

Based on the relevance scores, a particular content is selected for inclusion in a context-sensitive home screen. For example, the most-relevant content can be selected—in this example, the shopping list 1326. As shown in FIG. 13D, the projector subsystem 832 projects the shopping list as a context-sensitive home screen 1330 onto the palm 1000 of the user 1103. Other types of presentation are also within the scope of this disclosure, such as audio presentation, display on a screen, or transmission to another display device for display by the other display device (e.g., on an internal display of a vehicle). In implementations in which relevance determination is performed at the cloud computing platform 102, relevance scores and/or the determined particular content can be transmitted from the cloud computing platform 102 to the wearable multimedia device 101 for presentation.

Figure 14C:
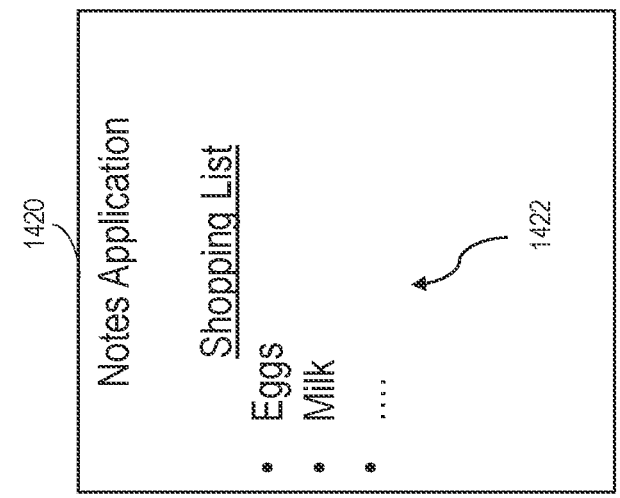
FIGS. 14A-14C are diagrams of examples of home screens, according to some implementations of this disclosure.
Figure 14B:
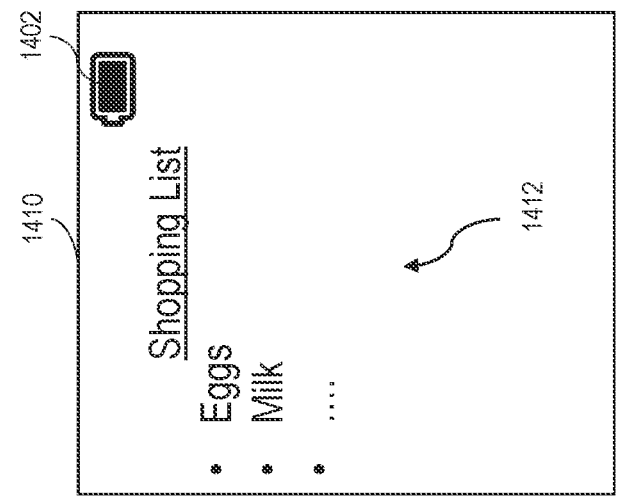
Figure 14A:
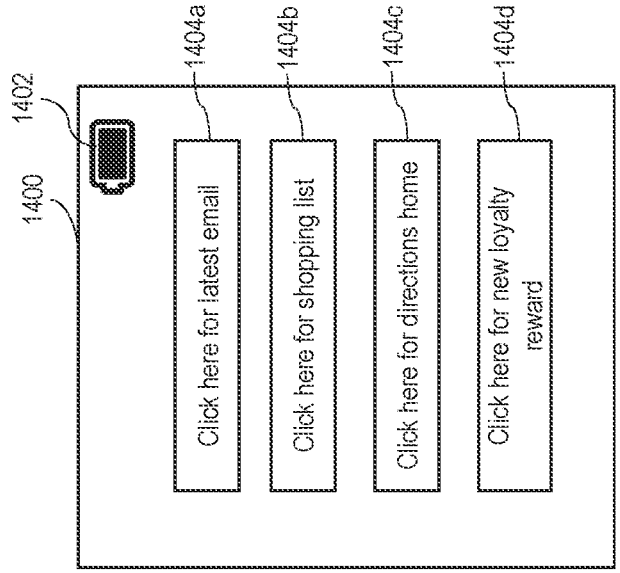

In some implementations, a formatting of the context-sensitive home screen is different from a formatting of alternative, non-context-sensitive home screens, referred to herein as "default" home screens. FIGS. 14A-14C show different types of home screens. As shown in FIG. 14A, a default home screen 1400 includes a status indicator 1402 (in this example, a battery level indicator) and multiple content icons 1404a, 1404b, 1404c, and 1404d, referred to collectively as content icons 1404. The content icons 1404 represent content that a user can determine to view, but the content icons 1404 do not fully include/present the content. For example, the content icons 1404 can be selectable icons that, when selectable by the user, cause display of the content, such as display of a scannable code in a loyalty reward application for content icon 1404d or display of a shopping list for content icon 1404b. The content icons 1404 can be notification icons/messages. As another example, the content icons 1404 can present truncated or otherwise limited versions of the content. For example, a content icon corresponding to an email may show a subject line of the email and some body content of the email, but the entire email may not be viewable without selection of the content icon to open a dedicated email application. As another example, the content icons 1404 can be associated with corresponding applications on the wearable multimedia device 101, e.g., such that selection of a content icon 1404 causes the corresponding application to be opened.

The content icons 1404 represent a non-specific assortment of content, which can be desirable in some cases, because a user can select whichever icon represents the content that the user wishes to view after opening their home screen. However, this approach neglects to provide proactively the particular relevant content that a user may wish to view, without the user being required to make further selections from the home screen to select the content from among various content.

In some implementations, as shown in FIG. 14B, a context-sensitive home screen 1410 displays particular content that has been determined to be relevant. For example, in some implementations, among a plurality of candidate content whose relevance was determined, a context-sensitive home screen displays only the particular content, without display of other candidate content. In other implementations, a context-sensitive home screen displays multiple particular content from the plurality of candidate content, without displaying one or more others of the candidate content. The particular content can be associated with a particular application of multiple applications on the wearable multimedia device.

The context-sensitive home screen 1410 can replace the default home screen 1400. For example, in some implementations, if at least some particular content satisfies one or more conditions, the particular content can be presented as the context-sensitive home screen 1410; otherwise, the default home screen 1400 is displayed. A condition can be that a relevance score of the particular content exceeds a first threshold value, and/or that a relevance score of the particular content is at least a second threshold value more than a relevance score of next-highest-scoring content. The former condition can provide that the particular content presented as the context-sensitive home screen 1410 is sufficiently relevant on an absolute scale. The latter condition can provide that the particular content is a sufficiently obvious selection of content to display, compared to other content.

In some implementations, the particular content can be displayed in an un-truncated or otherwise complete form. For example, an email can be displayed in a fully viewable (e.g., fully scrollable and/or un-truncated) manner. A scannable code (e.g., payment code or ticket code) can be displayed directly as the context-sensitive home screen. The particular content can be fully viewable without requiring the user to navigate to a second screen besides the context-sensitive home screen. For example, the particular content can be presented in the absence of further user interaction with the wearable multimedia device besides the waking interaction that caused the context-sensitive home screen to be displayed. By contrast, in the default home screen of FIG. 14A, a user is forced to select a content icon 1404 in order to view a complete version of the corresponding content.

In the example of a context-sensitive home screen 1410, the status indicator 1402 and a shopping list 1412 are displayed, where the shopping list 1412 is the particular content that was determined to be most relevant based on the context. Some implementations of a context-sensitive home screen do not include a status indicator 1402, e.g., include only the particular content. For example, all elements of the context-sensitive home screen can be associated with the particular content and/or with an application associated with the particular content.

In some implementations, the context-sensitive home screen is an interface of an application associated with the particular content. To present the context-sensitive home screen, the application is opened in response to a waking interaction, and the interface of the application is presented.

The formatting of the particular content as a context-sensitive home screen can be similar or identical, in at least some aspects, to formatting of the particular content in an application of the wearable multimedia device 101, where the application is a particular application corresponding to the particular content. In addition, or alternatively, the formatting of the particular content as a context-sensitive home screen can be different, in at least some aspects, from formatting of the particular content in a default home screen of the wearable multimedia device 101. FIG. 14C shows an example of an application interface 1420 of a particular application corresponding to the shopping list 1412. For example, the particular application corresponding to the shopping list 1412 might be a note-taking application. The shopping list 1422 in the application interface 1420 has a formatting matching the shopping list 1412 of the context-sensitive home screen. In various implementations, the matching formatting can match in text font, content size, amount of the particular content displayed at one time, arrangement of one or more elements of the content with respect to one or more other elements of the content, and/or another aspect of the formatting.

Figure 15:
FIG. 15 is a diagram of an example of a context-sensitive home screen, according to some implementations of this disclosure.

FIG. 15 shows an example context-sensitive home screen 1500 including a scannable code 1502. For example, the context-sensitive home screen 1500 can be displayed when context data indicates that the wearable multimedia device 101 is inside a coffee shop to which the scannable code 1502 is applicable. In response to a waking interaction by the user, the wearable multimedia device 101 directly displays the context-sensitive home screen 1500 including the scannable code 1502, without requiring further user interactions. Accordingly, the user can present the scannable code 1502 for scanning in an efficient, rapid, and user-friendly manner, without having to specifically select and open an application such as a coupon application.

The content selection and presentation processes disclosed herein can be applied to a multitude of possible functions and situations. Several exemplary, non-limiting examples are now presented in order to emphasize the breadth of implementations with the scope of this disclosure.

Context data indicates that the user is at a location of a booked homestay, e.g., based on location data of the wearable multimedia device cross-referenced with booking data provided by a native email application or a third-party homestay application. In response to a waking interaction, the context-sensitive home screen presents a door code used to access the homestay.

Context data indicates that the user is operating or is about to operate a thermostat, e.g., based on wireless communication between the thermostat and the wearable multimedia device or based on identification of the thermostat in a video stream captured by the wearable multimedia device. In response to a waking interaction, the context-sensitive home screen presents a history of energy use by the user's home's climate control system.

Context data indicates that the user is at a check-out area of a store, e.g., based on location data and/or based on video captured by the wearable multimedia device. In response to a waking interaction, the context-sensitive home screen presents an interface by which the user can select a payment method (e.g., a credit card or a direct checking account transfer). In response to the waking interaction, the context-sensitive home screen can present a code scannable to perform payment.

Context data indicates that a user is exercising, e.g., based on location data indicating that the user is at a gym or motion data indicating that the user is jogging on city streets. In response to a waking interaction, the context-sensitive home screen presents the user's pulse rate.

Context data indicates that a user is inspecting a work of art at a gallery, e.g., based on location data indicating that the user is at the gallery and based on video captured by the wearable multimedia device including the work of art. In response to a waking interaction, the context-sensitive home screen presents information about the work of art and its creator.

Context data indicates that a user has just completed a six-hour journey and is in a particular location, e.g., based on location history of the user. In response to a waking interaction, the context-sensitive home screen presents reviews of restaurants in a vicinity of the particular location.

Context data indicates that a user is socializing with two friends, e.g., based on the friends' faces being biometrically identified in video captured by the wearable multimedia device and/or based on locations of the friends' mobile devices being cross-referenced with the location of the user, in combination with data from a social network on which the friends are associated with the user. In response to a waking interaction, the context-sensitive home screen presents a camera application to capture a stylized selfie of the user and their friends.

Figure 16A:
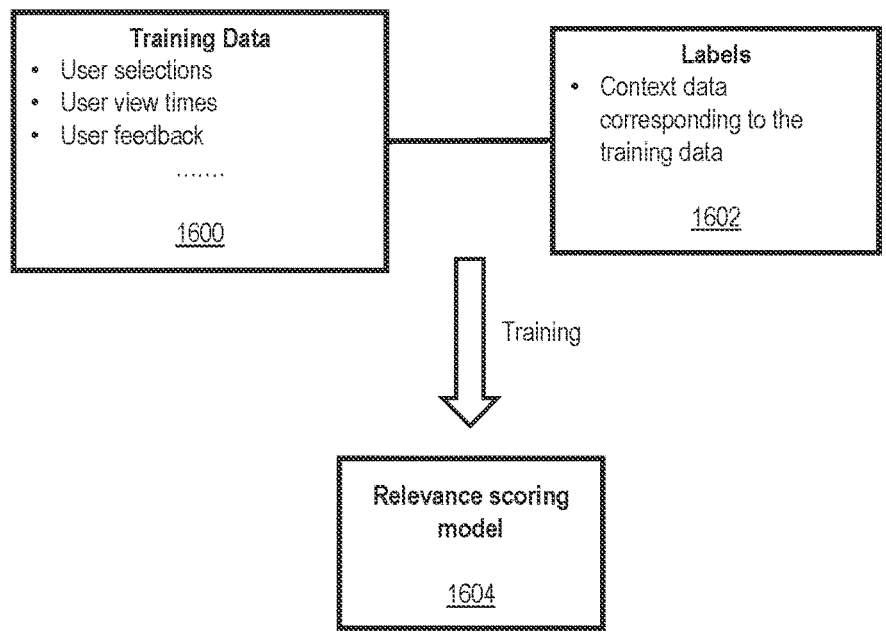
FIG. 16A is a diagram of an example of scoring model training, according to some implementations of this disclosure.

Relevance score determination can be implemented in various ways. In some implementations, the relevance determination process 1322 includes a machine learning component, such as one or more machine learning models. As shown in FIG. 16A, a scoring model 1604 can be trained based on training data 1600 and corresponding labels 1602. The training data 1600 includes data indicative of a relevance of particular content that has been presented to users, as context-sensitive home screens and/or in other presentation modes. For example, for a given presentation of content, the training data 1600 can indicate whether the user interacted with the content, how long the user viewed the content (where longer view times can be indicative of higher relevance), user feedback on content (e.g., "liking" or "disliking" content, or selecting a "this content is not relevant right now" button), whether a user navigated from the content in a context-sensitive home screen to a default home screen, and/or other relevance-indicating metrics. The training data 1600 can include data specific to a user for whom the scoring model 1604 is being trained, and/or data from other users.

The labels 1602 correspond to the training data 1600. For example, each element included in the training data 1600 can have one or more corresponding labels 1602. The labels 1602 include context data associated with presentation of the content referenced in the training data 1600. For example, an element of the training data 1600 can indicate that particular content was presented to a user as a context-sensitive home screen, and that the user interacted positively with the particular content. The labels 1602 can then include context data corresponding to presentation of the particular content, such as location data, video data (e.g., entities identified in video captured by a wearable multimedia device by which the particular content is presented), other sensor data, motion data, social data, data from one or more third-party platforms, and/or any other type of context data described herein.

The training data 1600 and labels 1602 are used to train a scoring model 1604. The scoring model 1604 learns to identify which content characteristics indicate content relevance to a user, given a set of context data. The scoring model 1604 can include any suitable machine learning network or combination of machine learning networks, such as a multilayer perceptron (MLLP), a convolutional neural network (CNN), and/or a recurrent neural network (RNN). In some implementations, the training includes iteratively adjusting weights of nodes in one or more layers of one or more learning networks such that the values of one or more loss functions that depend on the weights are reduced (e.g., minimized).

The scoring model 1604 can be a generic scoring model used to determine relevance scores for many users, or can be personalized scoring model for use with a specific user. In some implementations, when the scoring model 1604 corresponds to a specific user, training data 1600 corresponding to the specific user is weighted more heavily than training data 1600 corresponding to other users when training the scoring model 1604, so as to have more influence on parameters of the trained scoring model 1604. This can make the scoring model 1604 more responsive to the particular relevance preferences of the specific user.

Figure 16B:
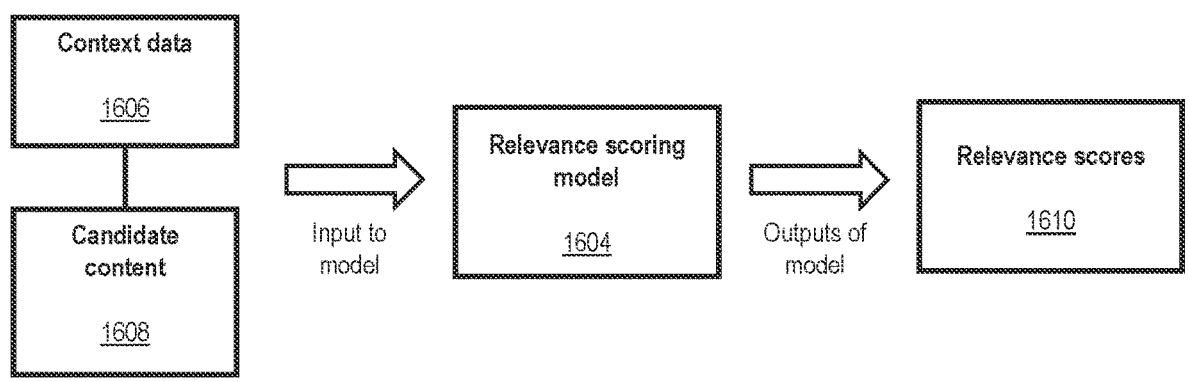
FIG. 16B is a diagram of an example of use of a scoring model, according to some implementations of this disclosure.

As shown in FIG. 16B, the trained scoring model 1604 can be used to determine relevance scores for content. Multiple content 1608 and context data 1606 are provided as inputs to the scoring model 1604. Based on the multiple content 1608 and the context data 1606, the scoring model 1604 determines relevance scores 1610 for each of the multiple content. An example of content scoring is shown in FIG. 13C: the context data 1314 and candidate content 1320 are input into the scoring model 1604 to determine relevance scores such as relevance score 1324.

Figure 17A:
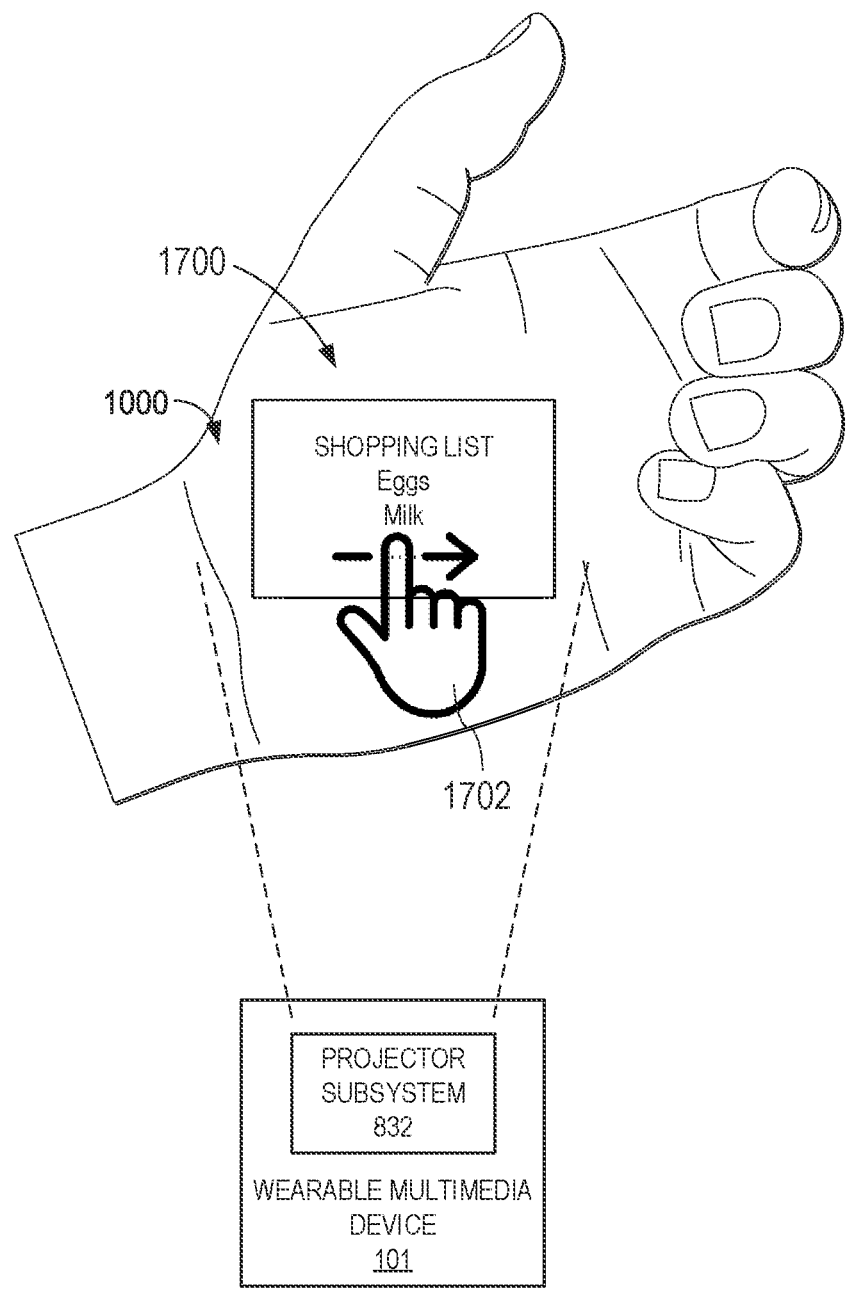
FIGS. 17A-17B are diagrams of examples of user interaction with a context-sensitive home screen according to some implementations of this disclosure.
Figure 17B:
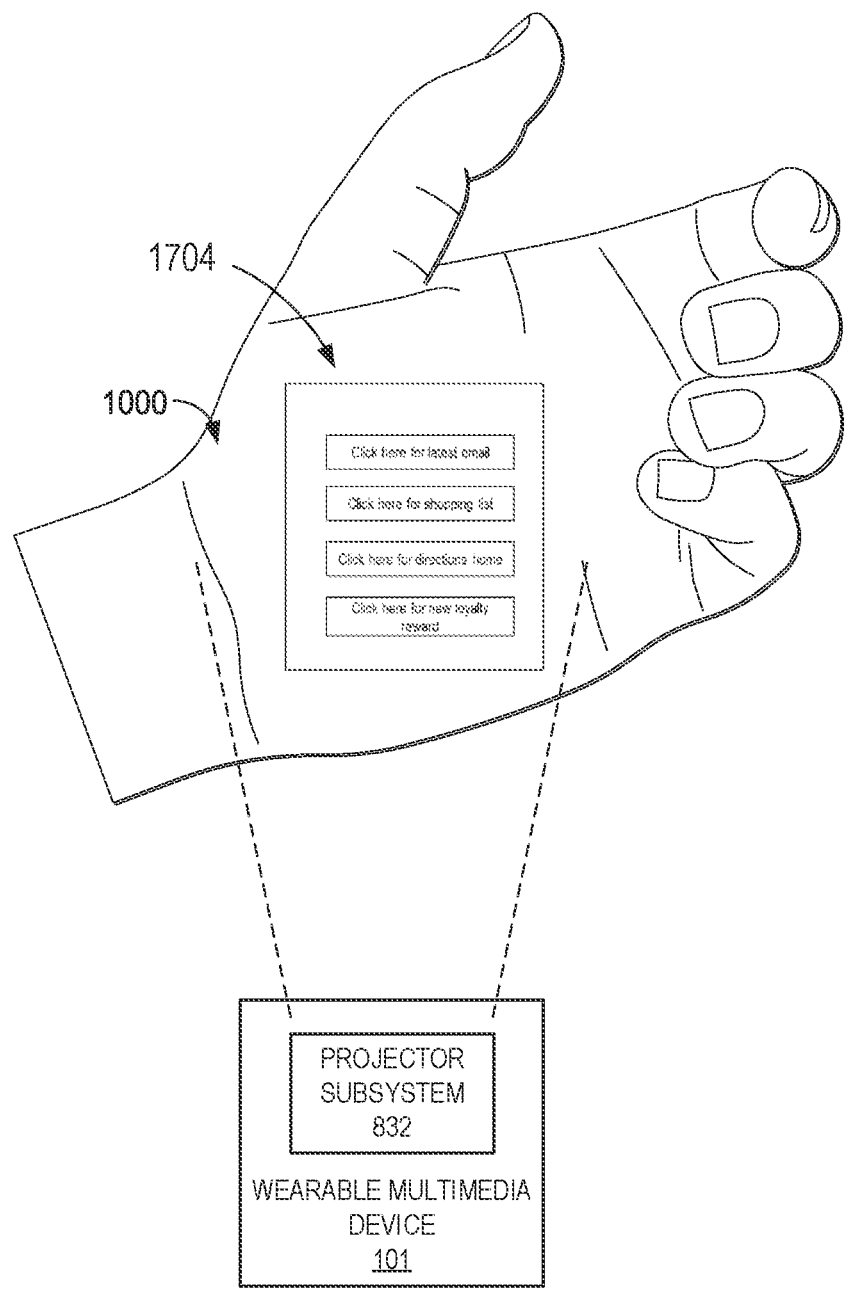

In some implementations, a presentation by a wearable multimedia device is switchable between a context-sensitive home screen and a default home screen. For example, as shown in FIG. 17A, a context-sensitive home screen 1700 is projected onto a palm 1000 by a projector subsystem 832. For example, the context-sensitive home screen 1700 can be projected in response to a waking interaction performed by the user. Subsequent to projection of the context-sensitive home screen 1700, a user performs a home screen switching interaction. In this example, the home screen switching interaction is a swipe 1702 across the context-sensitive home screen 1700; other interaction types are also within the scope of this disclosure. As shown in FIG. 17B, in response to the home screen switching interaction, the wearable multimedia device 101 projects a default home screen 1704 that is different from the context-sensitive home screen 1700.

Additional Example Processes

Figure 18:
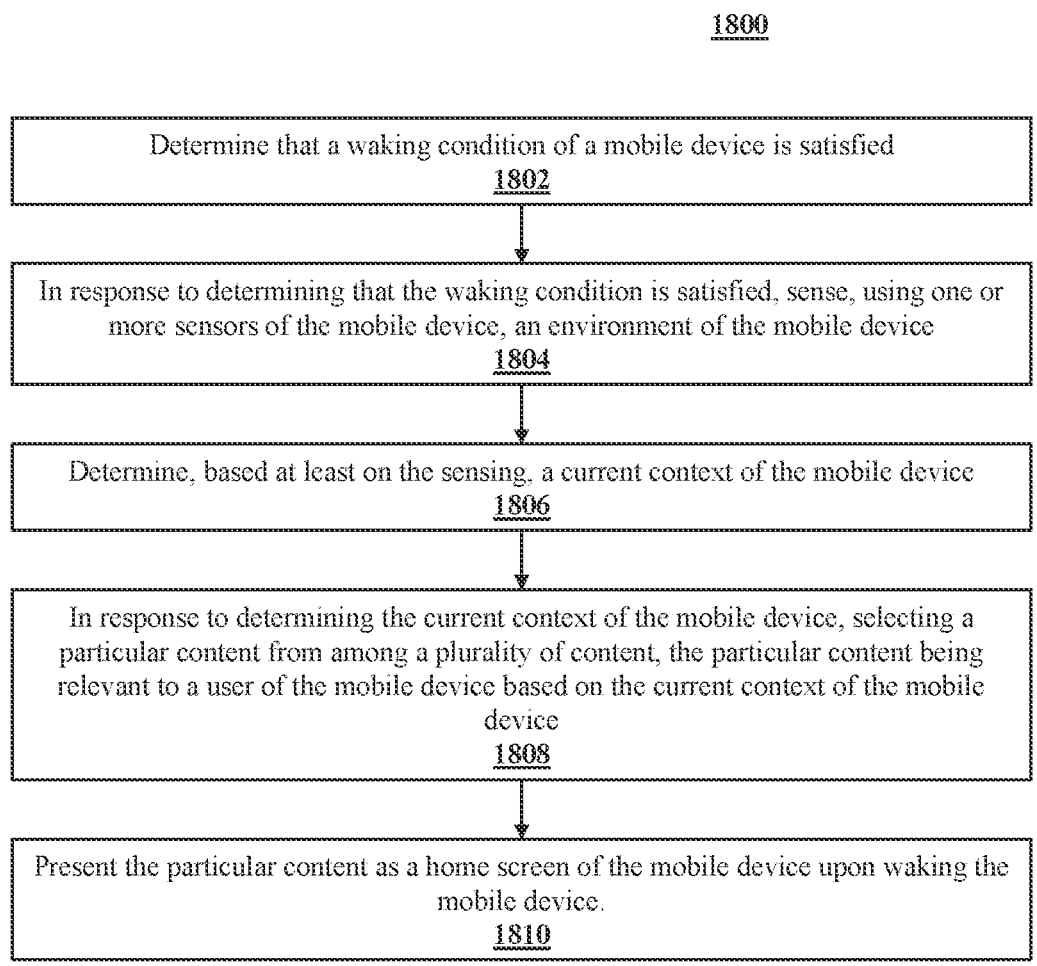
FIG. 18 is a flow diagram of an example of a process for home screen presentation, according to some implementations of this disclosure.

FIG. 18 is a flow diagram of an example of a process 1800 for presenting a context-sensitive home screen, according to some implementations. In some implementations, process 1800 is implemented using wearable multimedia devices 101 and using a cloud computing platform 102, as described in reference to FIGS. 1-9.

In the process 1800, it is determined that a waking condition of a mobile device is satisfied (1802). For example, the mobile device can be a wearable multimedia device. The waking condition can be an interaction by a user, such as a gesture, a spoken phrase, a gaze condition (e.g., a gaze condition as shown in FIG. 13A), or another type of interaction.

In response to determining that the waking condition is satisfied, an environment of the mobile device is sensed using one or more sensors of the mobile device (1804). For example, the sensors can include a location sensor such as a GPS receiver of location processor 815; a network sensor such as a Wi-Fi receiver, Bluetooth receiver, NFC receiver, or other network sensor; a visual sensor such as an imaging sensor of camera/video subsystem 820; an audio sensor such as a microphone of audio subsystem 826; or another type of sensor, such as described in reference to FIG. 8.

Based at least on the sensing, a current context of the mobile device is determined (1806). For example, one or more entities can be identified in images/video captured by the mobile device, and/or a location of the mobile device can be determined. Examples of context and sources based on which context can be determined are described in reference to FIGS. 11-12.

In response to determining the current context of the mobile device, a particular content is selected from among a plurality of content (1808). The particular content is relevant to a user of the mobile device based on the current context of the mobile device. For example, relevance scores are determined for the plurality of content (e.g., using a trained machine learning model), and the particular content is the content having a highest relevance score.

The particular content is presented as a home screen of the mobile device upon waking the mobile device (1810). For example, the particular content is presented as a context-sensitive home screen that presents the particular content in a complete and/or emphasized manner, e.g., as described in reference to FIGS. 14A-14C. In some implementations, the context-sensitive home screen is a user interface of an application associated with the particular content. The home screen can be presented on a display or projected onto a surface, e.g., as a VI.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor. Method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random-access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

One or more features or steps of the disclosed implementations may be implemented using an Application Programming Interface (API). An API may define on or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method, comprising:
 at a first time:
  detecting a first waking interaction by a user of a mobile device;
  based on detecting the first waking interaction, determining that a waking condition of the mobile device is satisfied;
  in response to determining that the waking condition is satisfied based on the first waking interaction, without further user interaction besides the first waking interaction, switching the mobile device from an inactive state to an active state,
   wherein switching the mobile device to the active state at the first time comprises displaying a default home screen as a first-displayed graphical user interface, and
   wherein the default home screen comprises a plurality of icons corresponding to a plurality of applications; and
  in response to a selection of a first icon of the plurality of icons, the first icon corresponding to a first application of the plurality of applications, opening the first application and displaying an application interface of the first application replacing the default home screen;
 at a second time subsequent to the first time:
  detecting a second waking interaction by the user;
  based on detecting the second waking interaction, determining that the waking condition of the mobile device is satisfied;

in response to determining that the waking condition is satisfied based on the second waking interaction, sensing, using one or more sensors of the mobile device, an environment of the mobile device;

determining, based at least on the sensing, a current context of the mobile device;

in response to determining the current context of the mobile device, identifying the first application from among the plurality of applications as including particular content relevant to the user of the mobile device based on the current context of the mobile device; and without further user interaction besides the second waking interaction, switching the mobile device from the inactive state to the active state, wherein switching the mobile device from the inactive state to the active state at the second time comprises displaying the application interface of the first application as the first-displayed graphical user interface, and wherein displaying the application interface of the first application as the first-displayed graphical user interface comprises presenting the particular content without presenting any other content from any other application of the plurality of applications; and at a third time subsequent to the second time:

detecting a home screen switching interaction with the application interface of the first application, and based on detecting the home screen switching interaction with the application interface of the first application, displaying the default home screen.

2. The computer-implemented method of claim 1, wherein the first waking interaction comprises a gaze of the user being directed at the user's palm, and wherein displaying the default home screen comprises projecting the default home screen onto the user's palm using a solid-state laser.

3. The computer-implemented method of claim 1, wherein sensing the environment of the mobile device using the one or more sensors comprises determining a current location of the mobile device using at least one of (i) one or more location sensors of the mobile device, or (ii) visual data captured by the mobile device, and wherein determining the current context comprises identifying an entity in proximity to the current location of the mobile device.

4. The computer-implemented method of claim 3, wherein the entity comprises a person distinct from the user, wherein the person is identified based on at least one of biometric identification by the mobile device, or cross-referencing the current location of the mobile device with a location of an additional mobile device associated with the person.

5. The computer-implemented method of claim 1, wherein determining the current context comprises accessing calendar data on the mobile device or on another computing device remote to the mobile device, wherein the current context comprises a current time relative to one or more events included in the calendar data.

6. The computer-implemented method of claim 1, wherein determining that the waking condition is satisfied comprises:

detecting, using a visual sensor, a known hand gesture performed by the user, or detecting, using an audio sensor, a known waking phrase spoken by the user.

7. The computer-implemented method of claim 1, wherein determining that the waking condition is satisfied is based on a gaze of the user.

8. The computer-implemented method of claim 1, wherein selecting the first application comprises:

inputting the current context of the mobile device into a machine learning model; and obtaining, as an output of the machine learning model, a selection of the particular content as most relevant to the user from among a plurality of content.

9. The computer-implemented method of claim 1, wherein the home screen switching interaction comprises a swipe on the application interface of the first application.

10. The computer-implemented method of claim 9, wherein the swipe on the application interface comprises a swipe across a palm of the user.

11. The computer-implemented method of claim 1, wherein identifying the first application as including the particular content relevant to the user of the mobile device comprises assigning each of a plurality of content elements a corresponding relevance score, wherein the plurality of content elements comprises a scannable code and an email.

12. The computer-implemented method of claim 1, wherein identifying the first application as including the particular content relevant to the user of the mobile device comprises assigning each of a plurality of content elements a corresponding relevance score, wherein the plurality of content elements comprises a transit schedule, and wherein assigning the corresponding relevance score to the transit schedule is based on a time until a scheduled appointment for the user.

13. The computer-implemented method of claim 1, wherein identifying the first application as including the particular content relevant to the user of the mobile device comprises assigning each of a plurality of content elements a corresponding relevance score, wherein the plurality of content elements comprises a loyalty card for a commercial establishment, and wherein assigning the corresponding relevance score to the loyalty card is based on a distance between the mobile device and the commercial establishment.

14. The computer-implemented method of claim 1, wherein identifying the first application as including the particular content relevant to the user of the mobile device comprises assigning each of a plurality of content elements a corresponding relevance score, wherein the plurality of content elements correspond to different locations, and wherein the corresponding relevance scores to the plurality of content elements corresponding to the different locations are weighted based on distances between the mobile device and the different locations.

15. The computer-implemented method of claim 1, wherein identifying the first application as including the particular content relevant to the user of the mobile device comprises assigning each of a plurality of content elements a corresponding relevance score, wherein the plurality of content elements comprise data associated with a household appliance, and wherein assigning the corresponding relevance score to the data associated with the household appliance is based on a determination, based on the current context, that the user is interacting with the household appliance.

16. The computer-implemented method of claim 1, wherein identifying the first application as including the particular content relevant to the user of the mobile device comprises assigning each of a plurality of content elements a corresponding relevance score,
  wherein assigning the corresponding relevance score to a first content element of the plurality of content elements is based on a past preference by the user that indicated content was not relevant.

17. The computer-implemented method of claim 1, wherein identifying the first application as including the particular content relevant to the user of the mobile device comprises assigning each of a plurality of content elements a corresponding relevance score,
  wherein the plurality of content elements comprise an entry code for a dwelling, and
  wherein assigning the corresponding relevance score to the entry code for the dwelling is based on location data of the mobile device cross-referenced with booking data for the dwelling.

18. The computer-implemented method of claim 1, wherein the current context indicates that the user is socializing, and
  wherein the particular content comprises a camera application configured to capture a stylized selfie of the user.

19. A wearable multimedia device, comprising:
  at least one processor; and
  memory storing instructions that, when executed by the at least one processor, cause the at least one processor to perform operations comprising:
  at a first time:
    detecting a first waking interaction by a user of the wearable multimedia device;
    based on detecting the first waking interaction, determining that a waking condition of the wearable multimedia device is satisfied;
    in response to determining that the waking condition is satisfied based on the first waking interaction, without further user interaction besides the first waking interaction, switching the wearable multimedia device from an inactive state to an active state,
      wherein switching the wearable multimedia device to the active state at the first time comprises displaying a default home screen as a first-displayed graphical user interface, and
      wherein the default home screen comprises a plurality of icons corresponding to a plurality of applications; and
    in response to a selection of a first icon of the plurality of icons, the first icon corresponding to a first application of the plurality of applications, opening the first application and displaying an application interface of the first application replacing the default home screen;
  at a second time subsequent to the first time:
    detecting a second waking interaction by the user;
    based on detecting the second waking interaction, determining that the waking condition of the wearable multimedia device is satisfied;
    in response to determining that the waking condition is satisfied based on the second waking interaction, sensing, using one or more sensors of the wearable multimedia device, an environment of the wearable multimedia device;
    determining, based at least on the sensing, a current context of the wearable multimedia device;
    in response to determining the current context of the wearable multimedia device, identifying the first application from among the plurality of applications as including particular content relevant to the user of the wearable multimedia device based on the current context of the wearable multimedia device; and
    without further user interaction besides the second waking interaction, switching the wearable multimedia device from the inactive state to the active state,
      wherein switching the wearable multimedia device from the inactive state to the active state at the second time comprises displaying the application interface of the first application as the first-displayed graphical user interface, and
      wherein displaying the application interface of the first application as the first-displayed graphical user interface comprises presenting the particular content without presenting any other content from any other application of the plurality of applications; and
  at a third time subsequent to the second time:
    detecting a home screen switching interaction with the application interface of the first application, and
    based on detecting the home screen switching interaction with the application interface of the first application, displaying the default home screen.

20. One or more non-transitory, computer-readable media storing instructions that, when executed by at least one processor, cause the at least one processor to perform operations comprising:
  at a first time:
    detecting a first waking interaction by a user of a mobile device;
    based on detecting the first waking interaction, determining that a waking condition of the mobile device is satisfied;
    in response to determining that the waking condition is satisfied based on the first waking interaction, without further user interaction besides the first waking interaction, switching the mobile device from an inactive state to an active state,
      wherein switching the mobile device to the active state at the first time comprises displaying a default home screen as a first-displayed graphical user interface, and
      wherein the default home screen comprises a plurality of icons corresponding to a plurality of applications; and
    in response to a selection of a first icon of the plurality of icons, the first icon corresponding to a first application of the plurality of applications, opening the first application and displaying an application interface of the first application replacing the default home screen;
  at a second time subsequent to the first time:
    detecting a second waking interaction by the user;
    based on detecting the second waking interaction, determining that the waking condition of the mobile device is satisfied;
    in response to determining that the waking condition is satisfied based on the second waking interaction, sensing, using one or more sensors of the mobile device, an environment of the mobile device;
    determining, based at least on the sensing, a current context of the mobile device;
    in response to determining the current context of the mobile device, identifying the first application from among the plurality of applications as including particular content relevant to the user of the mobile device based on the current context of the mobile device; and without further user interaction besides the second waking interaction, switching the mobile device from the inactive state to the active state, wherein switching the mobile device from the inactive state to the active state at the second time comprises displaying the application interface of the first application as the first-displayed graphical user interface, and wherein displaying the application interface of the first application as the first-displayed graphical user interface comprises presenting the particular content without presenting any other content from any other application of the plurality of applications; and at a third time subsequent to the second time:

detecting a home screen switching interaction with the application interface of the first application, and based on detecting the home screen switching interaction with the application interface of the first application, displaying the default home screen.

* * * * *